INVENTOR
Harry Szczepanski

INVENTOR
Harry Szczepanski

INVENTOR
Harry Szczepanski

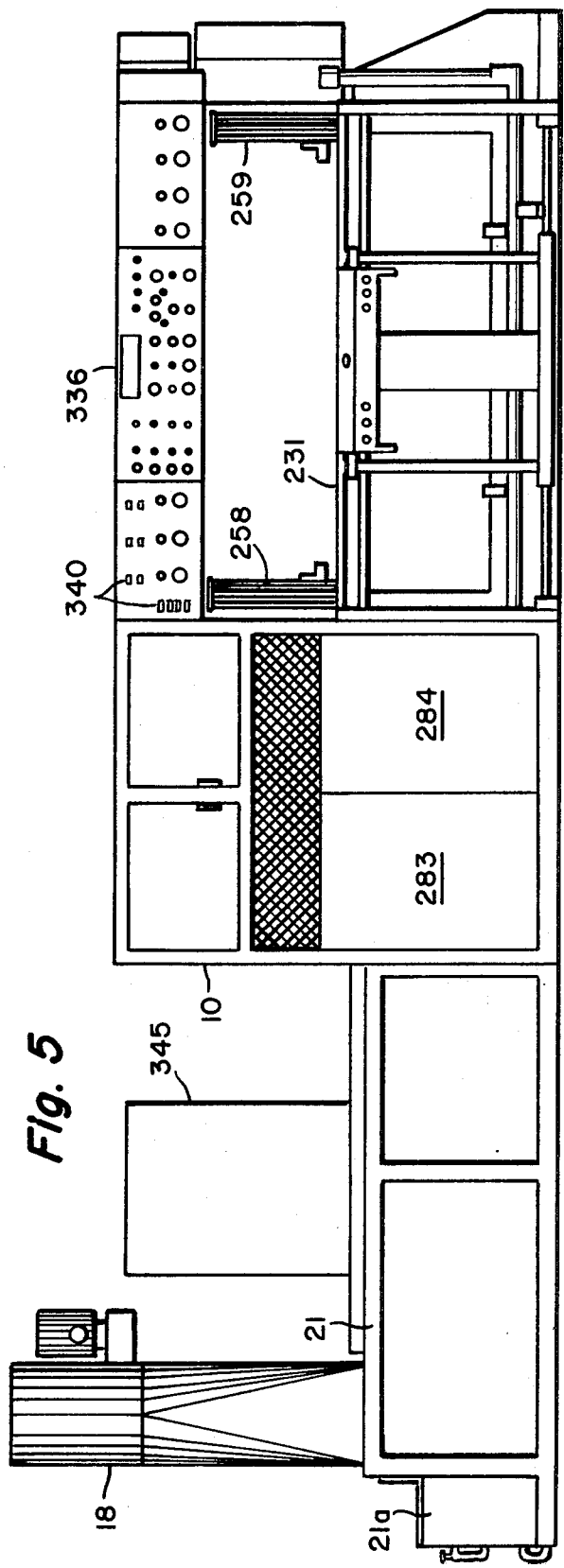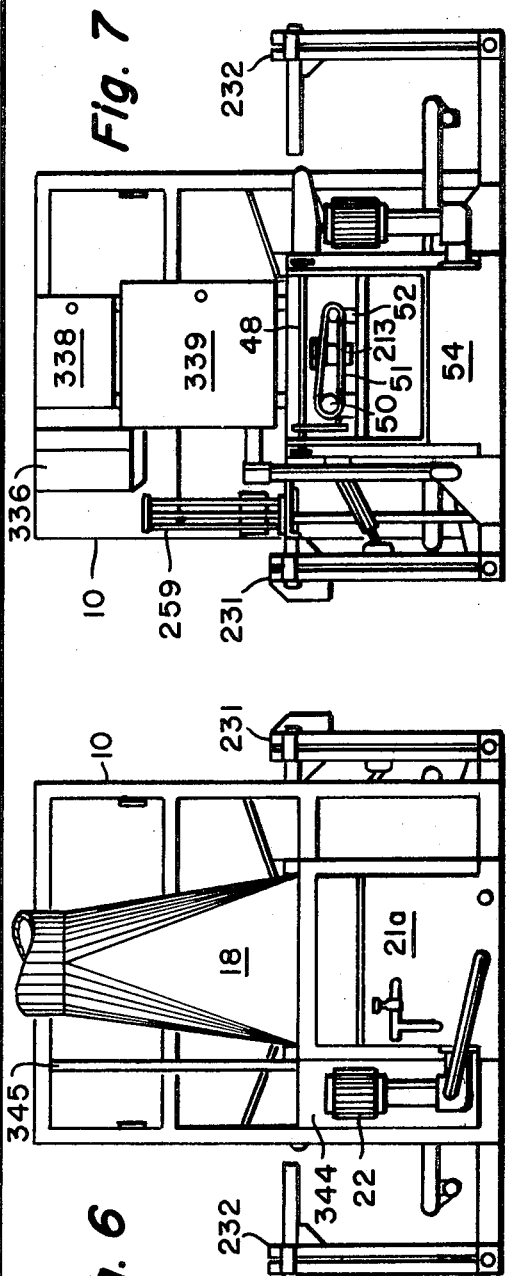

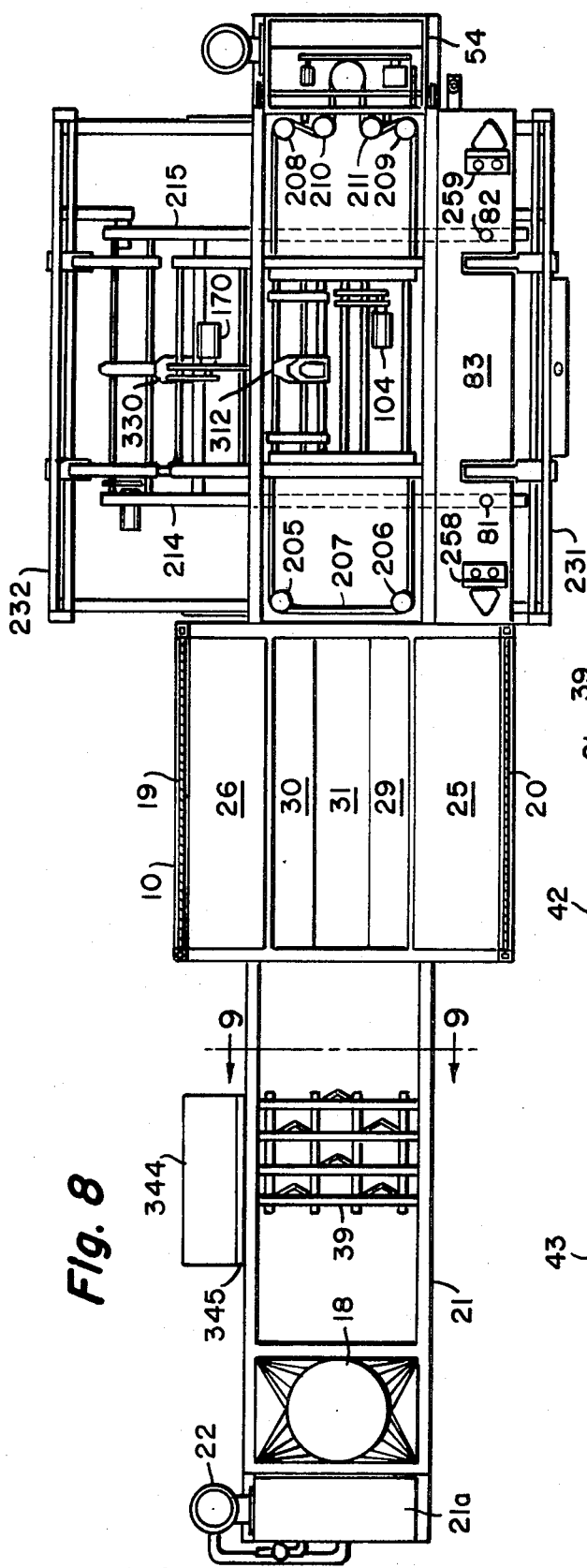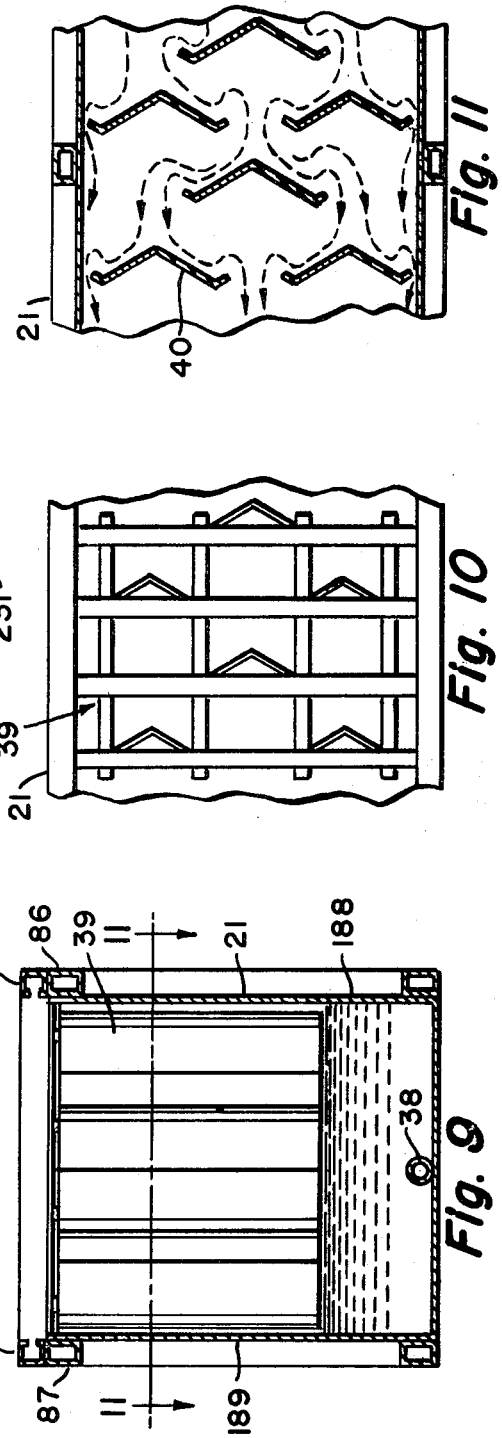

INVENTOR
Harry Szczepanski

INVENTOR
Harry Szczepanski

Feb. 13, 1973   H. SZCZEPANSKI   3,716,022
AUTOMATIC SPRAY-PAINTING MACHINE
Filed Oct. 8, 1970   23 Sheets-Sheet 9

INVENTOR
Harry Szczepanski

BY *Glenn R. Moore*
ATTORNEY

Feb. 13, 1973  H. SZCZEPANSKI  3,716,022
AUTOMATIC SPRAY-PAINTING MACHINE
Filed Oct. 8, 1970  23 Sheets-Sheet 10

INVENTOR
Harry Szczepanski

BY
ATTORNEY

INVENTOR
Harry Szczepanski
BY
ATTORNEY

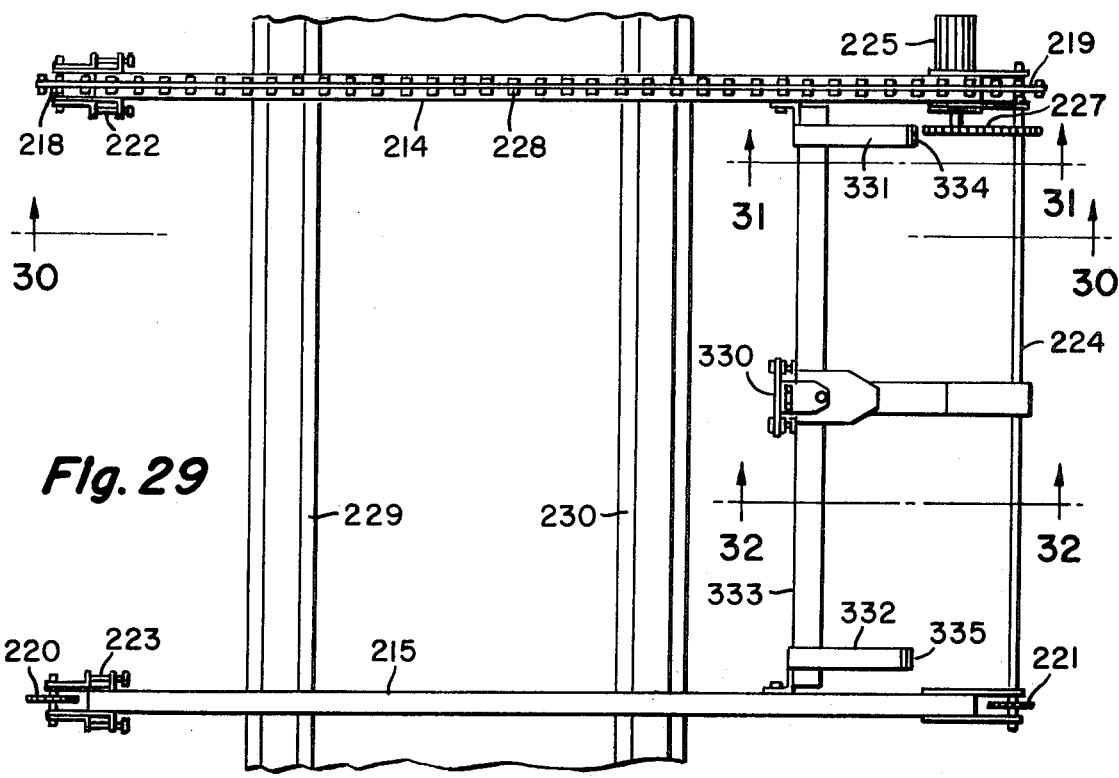
Fig. 29
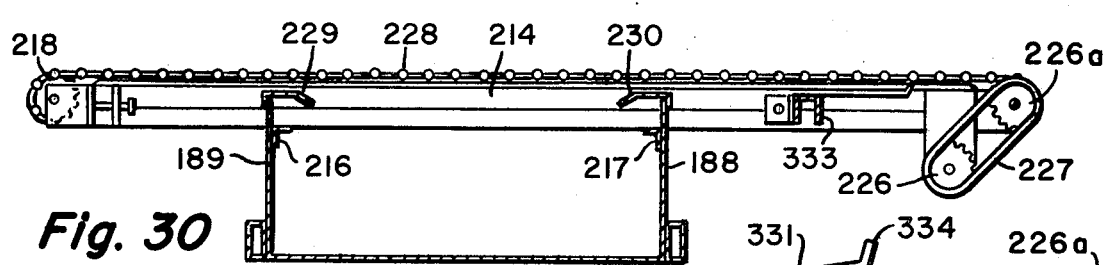
Fig. 30
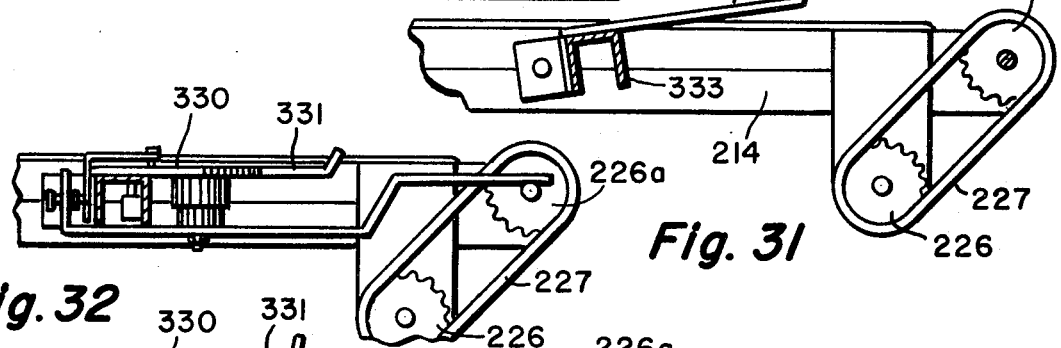
Fig. 31
Fig. 32
Fig. 33
INVENTOR
Harry Szczepanski
BY
ATTORNEY INVENTOR
Harry Szczepanski BY *Glenn R. Emory*
ATTORNEY Feb. 13, 1973 H. SZCZEPANSKI 3,716,022
AUTOMATIC SPRAY-PAINTING MACHINE
Filed Oct. 8, 1970 23 Sheets-Sheet 14

INVENTOR
Harry Szczepanski

BY *Glenn B. Morse*
ATTORNEY

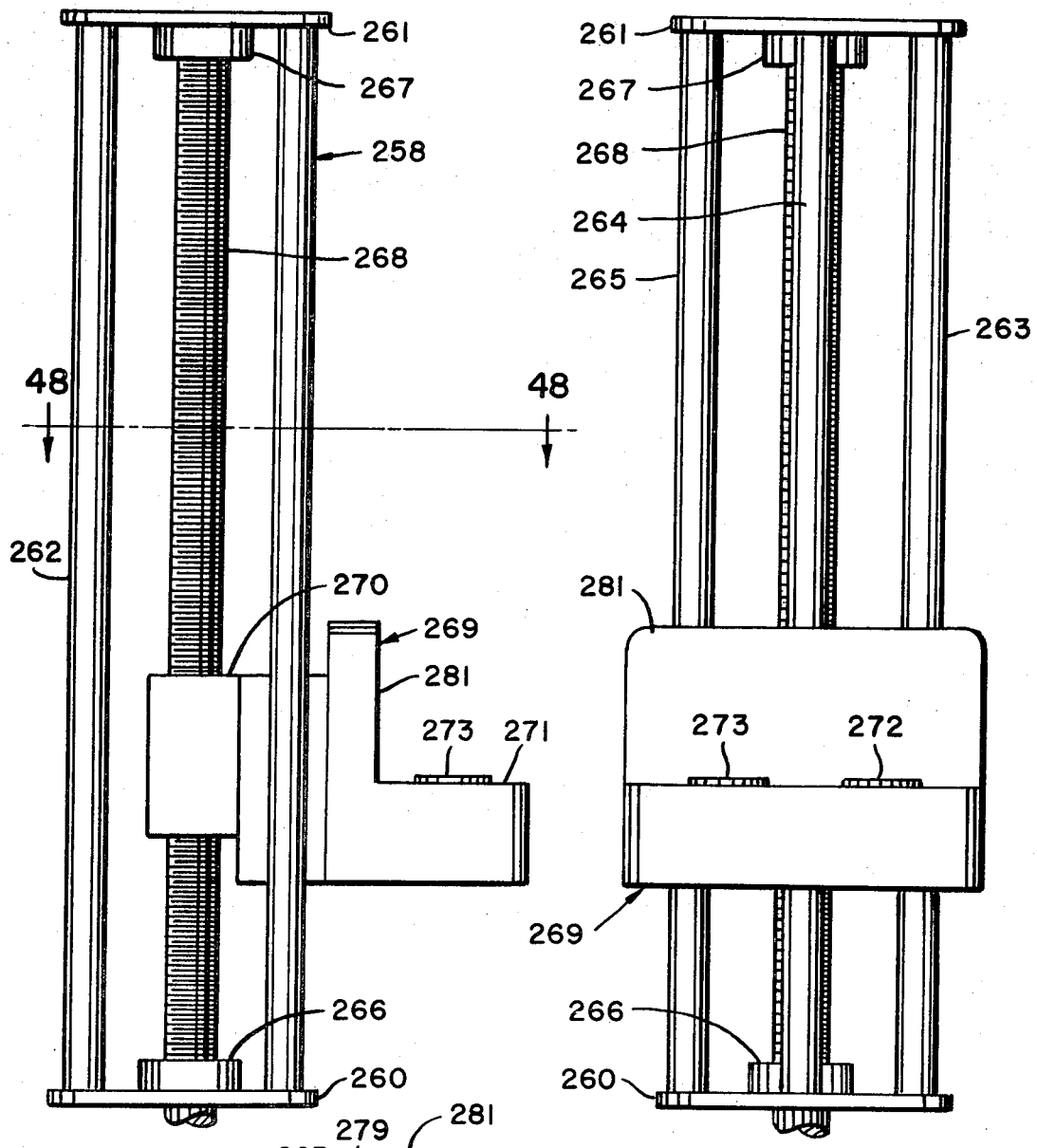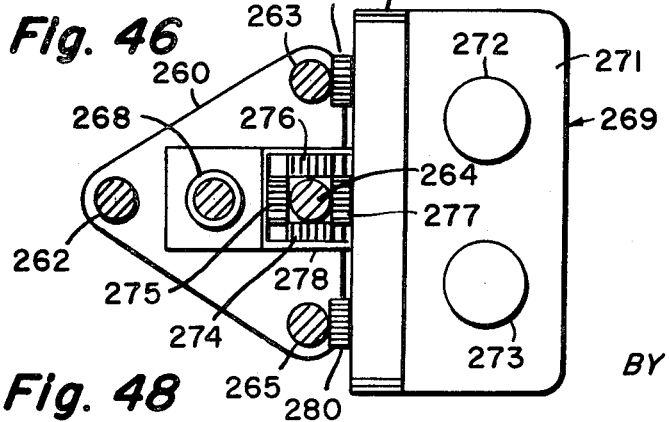

Feb. 13, 1973    H. SZCZEPANSKI    3,716,022
AUTOMATIC SPRAY-PAINTING MACHINE
Filed Oct. 8, 1970    23 Sheets-Sheet 18

INVENTOR
Harry Szczepanski

BY
ATTORNEY

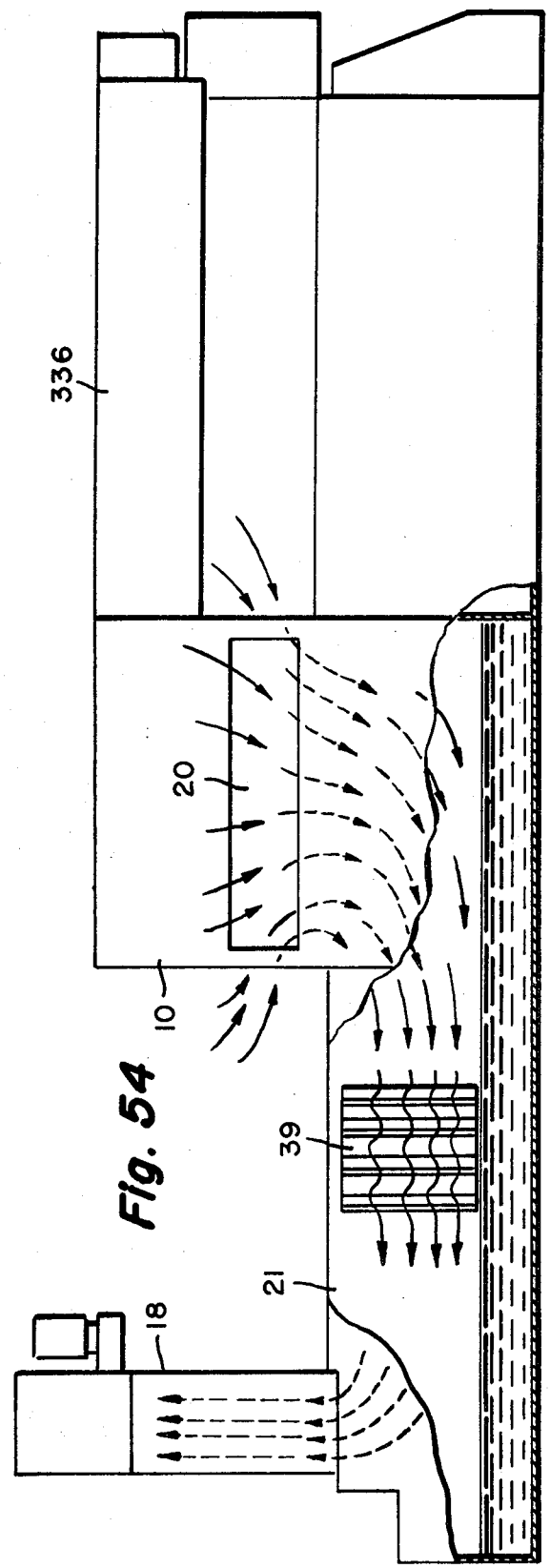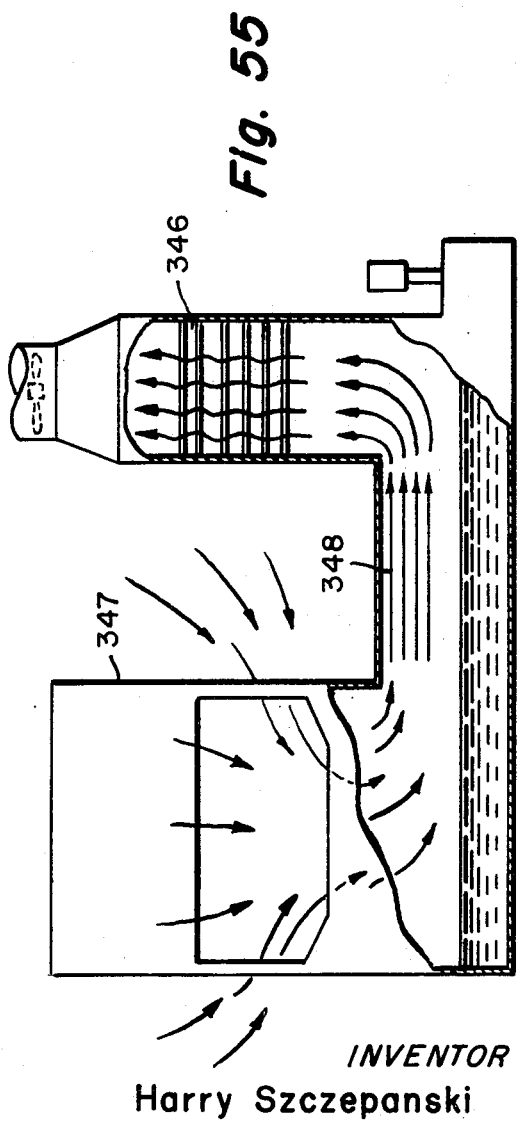

Feb. 13, 1973    H. SZCZEPANSKI    3,716,022
AUTOMATIC SPRAY-PAINTING MACHINE
Filed Oct. 8, 1970    23 Sheets-Sheet 22

INVENTOR
Harry Szczepanski

BY *[signature]*
ATTORNEY

INVENTOR
Harry Szczepanski

BY *Glenn B. Morse*
ATTORNEY

United States Patent Office 3,716,022
Patented Feb. 13, 1973

3,716,022
AUTOMATIC SPRAY-PAINTING MACHINE
Harry Szczepanski, 900 Clancy Ave. NE.,
Grand Rapids, Mich. 49503
Filed Oct. 8, 1970, Ser. No. 79,012
Int. Cl. B05b 1/28
U.S. Cl. 118—326                            3 Claims

ABSTRACT OF THE DISCLOSURE

A conveyor extends into a spray station from an exterior loading station. At least one fixture for supporting a mask and work pieces is engageable with the conveyor for movement into the spray station. The conveyor preferably continues the movement on through the spray station, and out the opposite side, so that the enclosure forming the spray station can be shorter than the length of the fixture assembly in the direction of movement of the conveyor. Space under one side of the conveyor is utilized for mask-washing equipment. Lateral transfer means, together with an elevator system, moves the work support and mask from the conveyor to and through the washing station. A program controller determines the painting cycle according to easily preset adjustments, and spray gun assemblies can be lifted out and installed as a unit for each job set-up. A down-draft ventilation system in the work station accommodates the wide range of painting conditions the machine is capable of handling.

BACKGROUND OF THE INVENTION

A common form of spray painting utilizes masking panels to shield the portions of workpiece surfaces that are not to receive paint in a particular painting operation. Cut-out areas on the mask panels permit the passage of paint on to the selected areas. It is common practice to provide for relative movement between the mask-workpiece assembly and the spray guns, either through the use of fixed gun assemblies and carriage or conveyorized movement of the workpieces, or by mounting the guns on a movable carriage supported on a guideway establishing a path of movement for the guns over fixed masks. Continuous or intermittent gun action can be programmed to fire the guns in spots, or along a predetermined path established by the relative movement between the guns and the masks. It is also standard practice to mount the guns on either transverse carriers or oscillators, or on a rotary mounting. In the latter case, a momentary cessation of the relative linear movement between the guns and the mask can provide for a ring-shaped spray pattern when this appears to be desirable. A proper selection of gun mounting and actuation, together with careful programming, can result in the deposition of paint primarily in the open areas of the mask, with a minimum wastage of paint outside of these areas.

Regardless of the efficiency of the machine in controlling the deposition of paint, it is inevitable that paint will accumulate on the masks, and on the fixtures supporting the workpieces and the masks in fixed relationship to each other. This paint accumulation must be washed off with suitable solvents, and most spray-painting machines require the removal of the masks (with or without the associated work-support fixtures) for manual transfer of these to a separate cleaning machine. Some machines have been devised in which the mask-washing functions are incorporated in the same machine in which the spray painting is performed. An example of this type of combined equipment is described and claimed in my U.S. Pat. No. 3,361,110.

In the development of spray-painting machines toward the point that is usually considered as "fully automated," a problem continually arises that seems to make the effort in developing such a machine self-defeating. It is extremely rare that any particular machine of substantial size can be devoted exclusively to one job over the full useful life of the machine. A typical situation encountered in the automotive industry provides an example of the problem involved. On the first year of production of a completely new painted panel, the machine can be left to perform this painting operation undisturbed throughout the production program. On subsequent years, however, there will be recurring necessity to shift from the type of production then current back to so-called "service jobs," in which repair or replacement parts are produced for previous models. The cost of the conversion of the machine, together with the interruption in the general production schedule as a result of the down-time on the painting equipment, represents a very severe burden. Change over from one job to another not only requires a change in programming, but changes in the work-supporting fixtures, changes in the type and actuation of the spray gun equipment, and changes in the position and alignment of the spray equipment with respect to the remainder of the machine. It is not at all unusual to require a full day to complete a change over from one job to another, and a consequent interruption in production schedules which may be dependent upon this operation are obvious. The change-over procedures frequently require the workmen to enter into the spray booth or housing, and to work around the equipment on which the paint has built up over long hours of use. The jobs is not only a miserable one to perform, but is one that must be entrusted to experienced and skillful employees capable of following careful instructions, and also capable of utilizing considerable initiative in arriving at the proper adjustment for the newly-installed pieces of equipment.

Another problem encountered in the design of heavily automated spray-painting machines is the maintenance of proper ventilation through the spray enclosure or station for any of the variety of spray gun positions that may be encountered. An approach commonly taken to this problem is simply to provide a sufficient excess in ventilation to cover any situation, but this approach results in the installation of blower equipment of excessive cost, and air flow volumes that may themselves create problems, It is conventional practice to cause the ventilation flow within a spray booth to impinge upon a curtain of water in solid or droplet form so that the particles of paint that are not impinged on either the workpieces or the mask are deposited on the water, rather than on the exposed surfaces of the machine. This is not only a problem of removing the necessity for periodically cleaning the machine, but also is a safety measure. Accumulations of paint in any area on a machine represent a fire hazard, in view of the high degree of inflammability of the ordinary paint materials. The design of water-wash curtain equipment to accommodate wide varieties in spray gun installations has followed the same general approach as the design of ventilation equipment, namely, the use of sufficient excess in capacity to be sure and handle all possible situations. This approach has the expected effect on the cost of pumping and piping.

SUMMARY OF THE INVENTION

The present invention provides a single machine integrating the various operations associated with spray painting into a single structure in which the change over from one job to another is a simplified procedure in comparison with any equipment currently available. Workpieces and masks are mounted on a work-support fixture in predetermined relationship, and this sub-assembly is engageable and disengageable from a conveyor establishing a path of movement from a loading station into the structure forming the spray station. Preferably, the movement includes a continuation of the work-support sub-assembly on through and out the opposite side of the spray station. The section of the conveyor extending out on one side of the spray station is utilized as a loading station, and mask-washing equipment is preferably incorporated in the space underneath this portion of the conveyor. A lateral transfer mechanism, in conjunction with a lifting system, serves to move the workpiece support (together with its mask and workpiece) laterally from the principal conveyor, and carries it down and through the washing equipment. This movement is preferably continued on out the opposite side of the washing equipment, and upward to a position where it can be transferred back into engagement with the principal conveyor, or fully across again to a position that can be utilized for loading and unloading the workpieces from the mask and the support fixture. Preferably, the machine is equipped with a plurality of workpiece-mask support fixtures so that loading and washing can take place while a programmed painting operation is in process.

Spray gun modules arranged for a particular job are installed in the machine as a unit, and facilities are provided for plugging in these modules with the compressed air and paint service, together with the usual control connections, that are necessary. A resettable control unit in the machine is readily adapted to the particular job associated with a particular spray gun module, and this controller is preferably related to the linear movement of the carrier of the conveyor that determines the passage of the mask and workpiece through the spray station.

A positive proportional interrelationship between the controller and this conveyor movement makes it possible for the technician to make direct adjustments according to his judgment, and to incorporate a specific list of data associated with the particular spray painting operation in the machine without having to resort to trial and error.

The present invention provides a ventilation and water-wash system capable of handling the tremendous variety of possible painting applications the machine is capable of handling, without incorporating an undesirable excess capacity. The ventilation utilizes a down-draft flow through the spray station and past the workpiece mask assemblies onto a water curtain disposed directly below. Inflow induced by the ventilation system through the various openings in the housing providing the spray station tends to maintain spray particles on a path that will impinge them directly on the water curtain. The downward movement of the particles and the draft is thus supplemented by the action of gravity. Provision is made for causing the ventilation flow to pass through a curtain of droplets after the initial impact of the ventilation flow on a surface of solid water. This arrangement, coupled with the use of curtains of water proceeding along inclined surfaces at the side of the work station, provides a highly effective system for keeping the machine purged of the accumulation of paint and vapor without the use of excessive water or air-handling capacity.

DESCRIPTION OF THE DRAWINGS

FIG. 5 (Sheet 5) is a front elevation of the machine shown in FIG. 1.

FIG. 6 (Sheet 5) is a view in elevation of the left end of the machine, as shown in FIG. 1.

FIG. 7 (Sheet 5) is a view in elevation of the right end of the machine, as shown in FIG. 1.

FIG. 8 (Sheet 6) is a plan view of the machine as shown in FIG. 2 with the upper portion of the central housing removed to reveal the underlying spray chamber structure.

FIG. 9 (Sheet 6) is a sectional elevation on the plane 9—9 of FIG. 8, on an enlarged scale.

FIG. 10 (Sheet 6) is a view on an enlarged scale of the moisture arrester.

FIG. 11 (Sheet 6) is a sectional view on a horizontal plane through the moisture arrester assembly shown in FIG. 10.

FIGS. 19 and 20 are in projection.

FIG. 29 (Sheet 12) is a plan view of the lower transfer mechanism.

FIG. 30 (Sheet 12) is a sectional elevation of the plane 30—30 of FIG. 29.

FIG. 31 (Sheet 12) is a sectional elevation on the plane 31—31 of FIG. 29, on an enlarged scale.

FIG. 32 (Sheet 12) is a sectional elevation on the plane 32—32 of FIG. 29, on an enlarged scale.

FIG. 33, (Sheet 12) is a view similar to FIG. 32, showing the stop and detector mechanism in the actuated condition.

FIG. 45 also illustrates the arrangement for holding the carrier in position with respect to the machine for the transfer procedure.

FIG. 46 (Sheet 17) is an elevation on an enlarged scale showing one of the mask-lifting jacks at opposite sides of the loading station.

FIG. 47 (Sheet 17) is a front view of the jack assembly shown in FIG. 46.

FIG. 48 (Sheet 17) is a sectional view on the plane 48—48 of FIG. 46.

FIG. 54 (Sheet 19) is a draft diagram associated with the machine shown in FIG. 1.

FIG. 55 (Sheet 19) is a draft diagram associated with the machine arrangement shown in FIG. 56.

DESCRIPTION OF THE PREFERRED EMBODIMENTS

Figure 1:
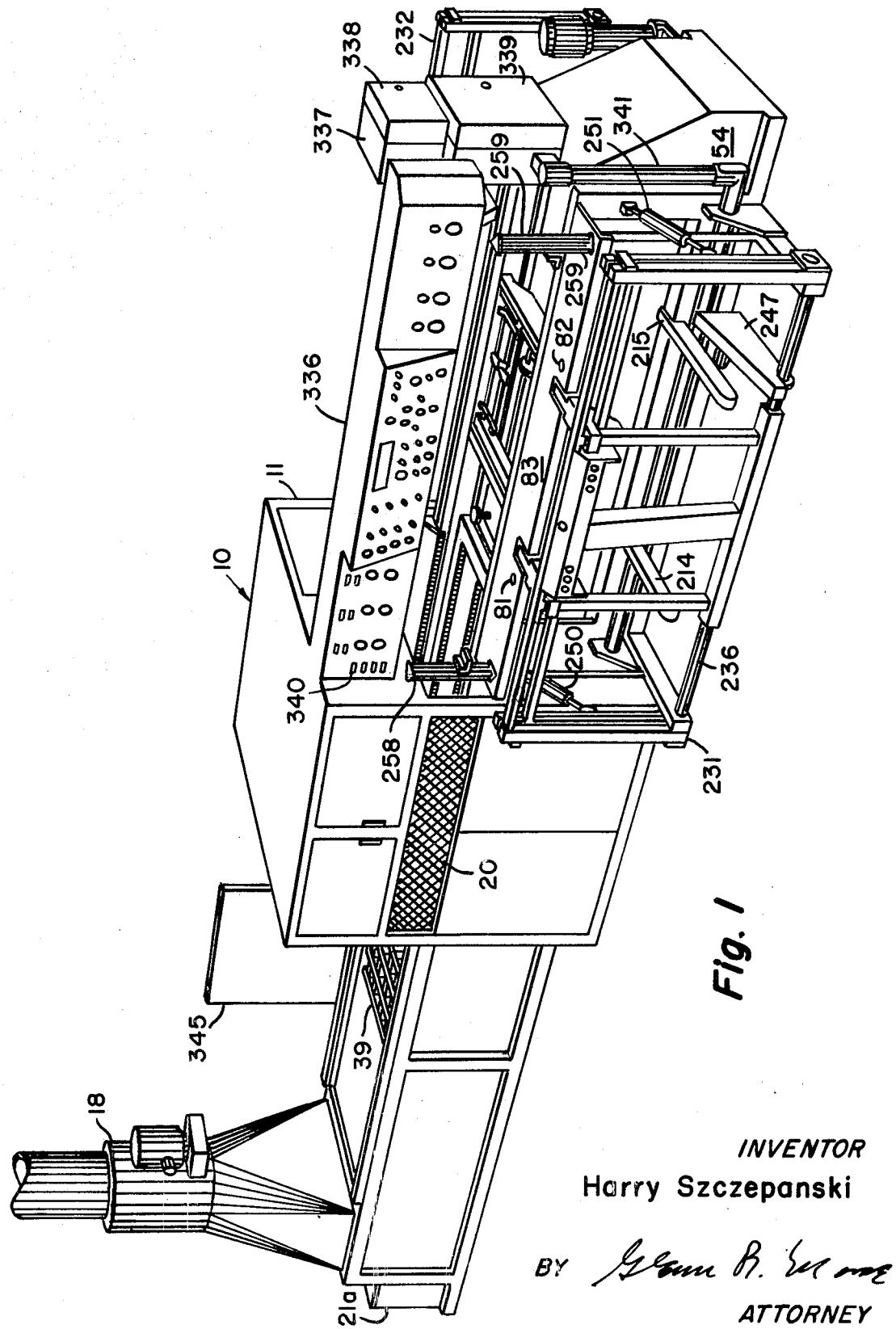
FIG. 1 (Sheet 1) is a perspective view of a complete machine embodying one form of the present invention.
Figure 37:
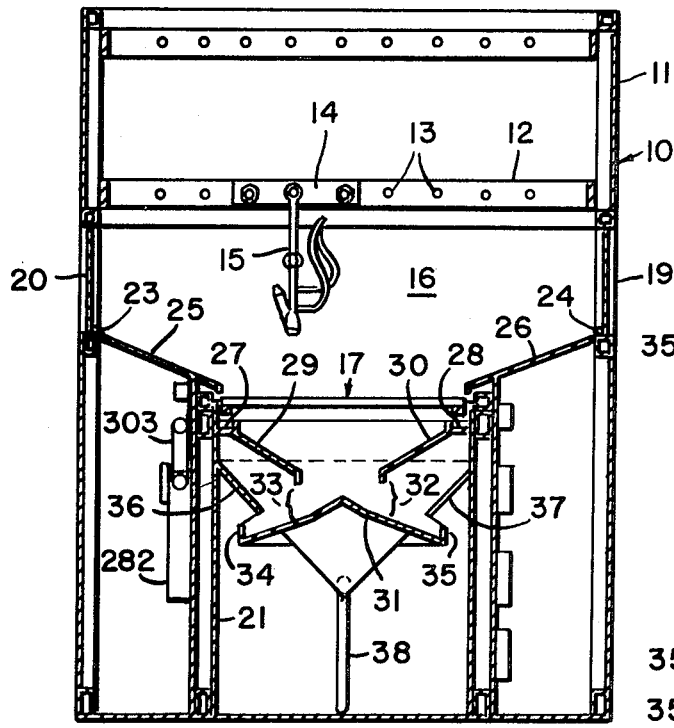
FIG. 37 (Sheet 14) is a sectional elevation through the central housing and paint-spraying system.
Figure 38:
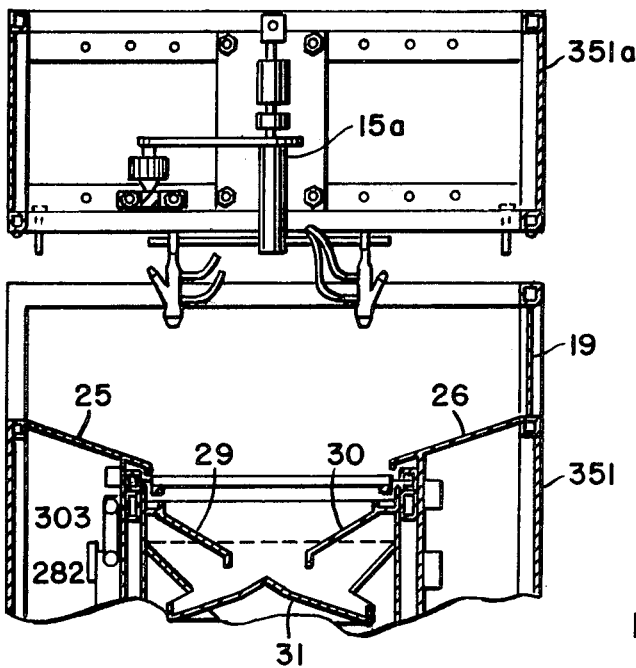
FIG. 38 (Sheet 14) is a view similar to FIG. 37, showing the upward displacement of a modular section of the housing, providing for the removal of the entirety of the spray equipment at once.
Figure 39:
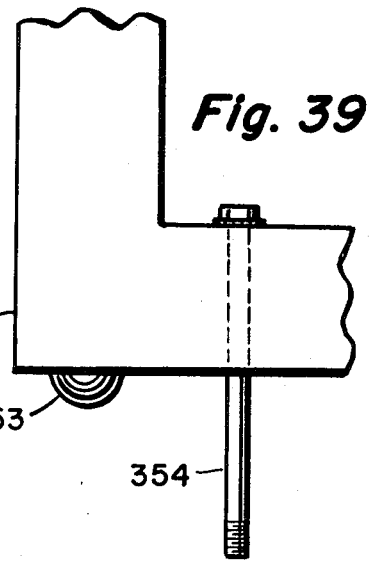
FIG. 39 (Sheet 14) is a fragmentary view showing the structure of the corner of the spray mechanism module shown in FIG. 38, on an enlarged scale, showing the arrangement for location and attachment of the module to the remainder of the housing.
Figure 40:
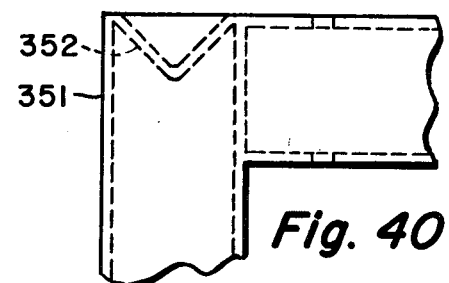
FIG. 40 (Sheet 14) is a view on an enlarged scale of the corner of the housing adapted to receive the structure shown in FIG. 39.

The machine illustrated in FIG. 1 has a central housing 10 defining a spray chamber. Referring to FIG. 37, (Sheet 14), the upper portion 11 of the housing has a frame 12 provided with a group of mounting points 13 for securing a bracket 14 carrying a standard spray gun unit 15. This unit can be placed in a number of locations, according to the particular spraying operation to be performed. Spray is projected within the space 16 defined by the housing 10, and this space is traversed by the conveyor generally indicated at 17 to carry the workpiece-mask assemblies through the spray area in a controlled sequence of movements. This selected sequence, together with the particular positions of the gun bracket 14, are predetermined for each particular production run.

To prevent the accumulation of explosive vapors in and around the machine, a high-velocity inflow of air into the space 16 is induced by a conventional suction fan (not shown) associated with the exhaust duct system 18. In the modification shown on FIG. 1, the suction applied by this duct system induces an inflow through the screens 19 and 20 at the front and back, respectively, of the housing 10 (refer to FIG. 37, Sheet 14). A similar inflow takes place through the side openings in the housing 10 traversed by the conveyor 17. The general pattern of the flow of air in this modification of the invention is illustrated in FIG. 54 (Sheet 19). This ventilation flow moving into the space 16 is then pulled downwardly by the suction applied to the under side of the housing through the horizontal duct 21 communicating between the housing 10 and the exhaust system 18. The lateral duct 21 continues into the housing 10, and also functions as a tank for the accumulation of water for the "water-wash" system. An end extension 21a is incorporated as a housing for a float-controlled valve system (not shown) for maintaining a predetermined water level. A conventional pump 22 delivers a continuous supply of water to the conduits 23 and 24, which provide a moving sheet of water over the inclined panels 25 and 26, respectively. Similarly, a supply of water is delivered to the conduits 27 and 28, which provide a moving sheet of water over the lower inclined panels 29 and 30, respectively. This cascade of water moves down to the receiver 31 under the combined effect of gravity and the high velocity air flow moving downward in the space 16. This flow of air moves through the gaps 32 and 33, representing falling sheets of free water. Entrained droplets of paint are thus impinged on the water particles as the ventilation flow moves through this moving sheet. The opposite sides 34 and 35 of the receiver 31 provide a trough entrapping a quantity of water. The downflow of air passes from the gaps 32 and 33 to the front and rear of the machine toward the sides 34 and 35, and from here it is deflected upwardly by the sides 34 and 35 on to the deflectors 36 and 37. The downflow of air across the water entrapped by the edges 34 and 35 tends to sweep the receiver 31 free of water, and to produce a second screen of water droplets extending upwardly from the edges 34 and 35 to the deflectors 36 and 37. Ventilation air is therefore moved through two stages of water curtains, producing a very efficient entrapment of air-entrained paint particles. Water can be maintained in the receiver 31 at any desired level, and is delivered through the pipe 38. After flowing over the edges of the receiver 31, the water accumulates in the tank formed by the bottom of the duct 21. The flow of air continuing over the top of the water accumulating in this tank moves laterally through the moisture entrapment assembly 39 shown in FIGS. 9–11 (Sheet 6). This assembly is essentially a vertical array of spaced sheet metal panels bent to a cross-sectional configuration forming interceptor plates 40 as shown in FIG. 11. These interceptor plates 40 are mounted in a relationship which forces the air flow (shown in dotted lines in FIG. 11) to traverse a serpentine path, thus utilizing inertia to impinge entrained droplets of moisture on to panels 40, where they drain downward into the bottom of a duct-tank 21. A very significant aspect of the draft arrangement is the supplementing of the effect of gravity on the droplets of paint projected within the space 16 by the downward direction of the flow of ventilating air into direct impingement upon moving sheets of water protecting the surfaces of the machine.

Figure 3:
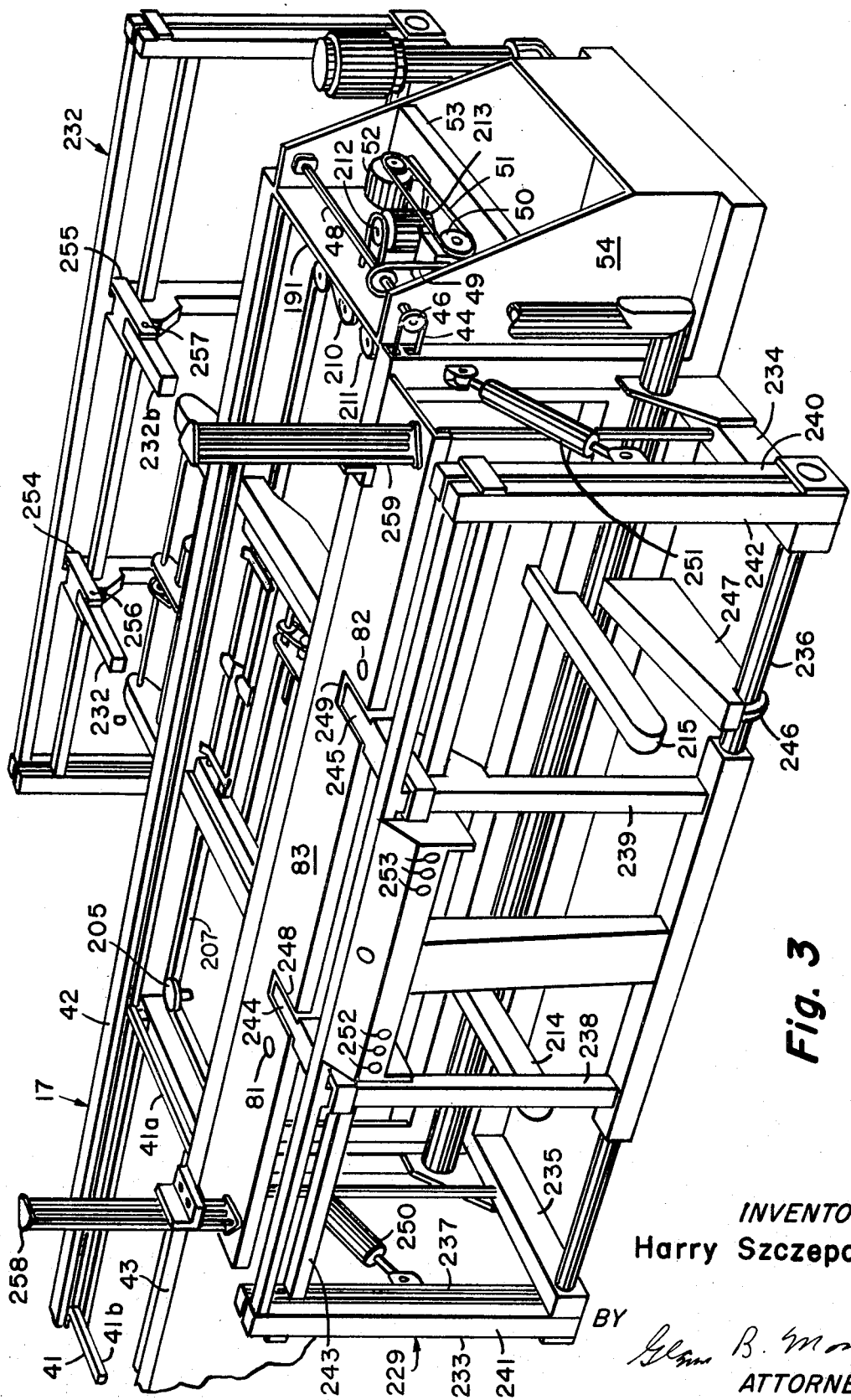
FIG. 3 (Sheet 3) is a perspective view on an enlarged scale over that of FIGS. 1 and 2, showing the mechanism at the right-hand portion of the machine.

The conveyor system 17 centers in a carrying frame 41 moving along the guideway rails 42 and 43 (refer to FIG. 3, Sheet 3). This carrier is moved by the endless chains 44 and 45 passing over the sprockets 46 and 47 (referring to FIGS. 3 and 4 on Sheets 3 and 4, respectively) driven by the shaft 48. This shaft is provided with power by the chain 49 driven by the output of the speed-reducer 50, which is, in turn, provided with power by the chain 51 driven by the motor 52. The speed reducer 50 and the motor 52 are supported on the shelf 53 within an enclosure structure 54 that may be considered as part of the framework of the machine. The conveyor chains 44 and 45 extend to the opposite end of the machine, where they pass over idlers not shown in the drawings.

The primary function of the conveyor carrier 41 is to transport the work assemblies 55 through the spray space 16. These work assemblies are best shown in FIGS. 49–53 on Sheet 18. A base frame 56 functions as a support for an endless variety of possible brackets and abutments (commonly referred to as a "nest") that can be mounted as desired to properly position a particular workpiece. A mask 57 (shown in blank form) is cut out at appropriate areas over the workpieces to admit paint spray in these selected areas only. The accurate positioning of the mask with respect to the work pieces is obtained through the locating posts 58 and 59 fixed to the brackets 60 and 61 on the base frame 56. These posts register with the openings 62 and 63, respectively, and the support of the mask at a predetermined height above the frame 56 is controlled by the heads of the bolts 64–67. The bolt 65 has a special head providing a small projection 68 registering with the opening 69 in the mask to permit the full installation of the mask only in one orientation. This arrangement prevents the mask from being inadvertently placed in and end-for-end relationship, which would bring the mask out of registry with the position of the workpieces. The vertical position of the heads of the bolts 64–67 is established by the nuts 70–73 engaging the tops of the flanges 74 and 75 of the brackets 60 and 61, respectively. A similar set of nuts engages these bolts on the under side of the flanges to complete the securing of these members. The locating posts 58 and 59 are secured by the effect of the interengagement of the threaded portions 76 engaging the nuts 77 and 78 secured, respectively, to the bracket shelves 74 and 75 and to the base frame 56. The base frame is provided with locating apertures 79 and 80 which register with dome-shaped projections 81 and 82 on the shelf 83 (refer to FIG. 1) defining the loading station of the machine.

Figure 13:
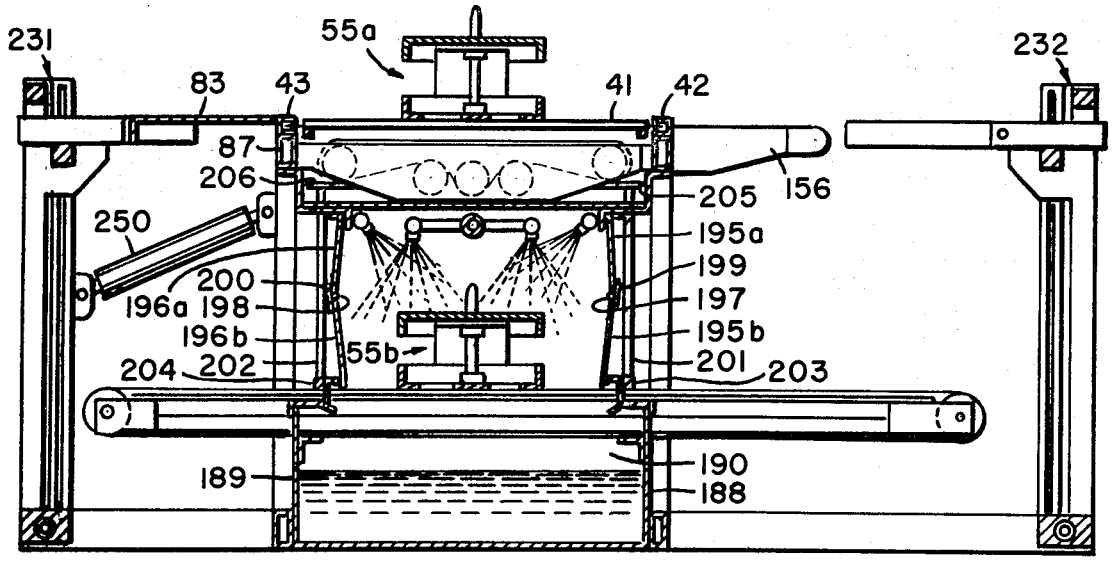
FIG. 13 (Sheet 8) is a sectional elevation on an intermediate vertical plane intersecting the loading station, the transfer system, and the mask-washing station.
Figure 16:
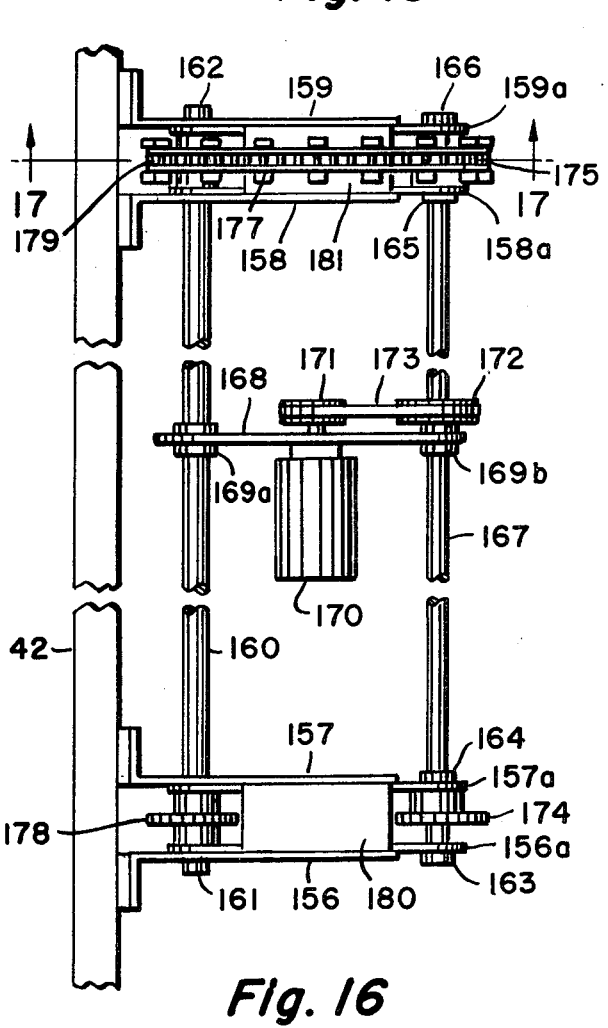
FIG. 16 (Sheet 9) is a view on an enlarged scale of the right-hand portion of the upper transfer mechanism, as viewed in FIG. 15.
Figure 17:
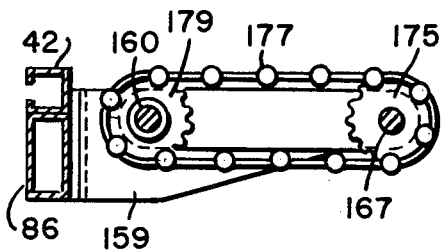
FIG. 17 (Sheet 9) is a view on the plane 17—17 of FIG. 16.
Figure 18:
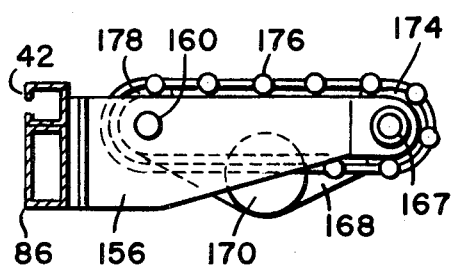
FIG. 18 (Sheet 9) is an end view of the mechanism shown in FIG. 16.
Figure 19:
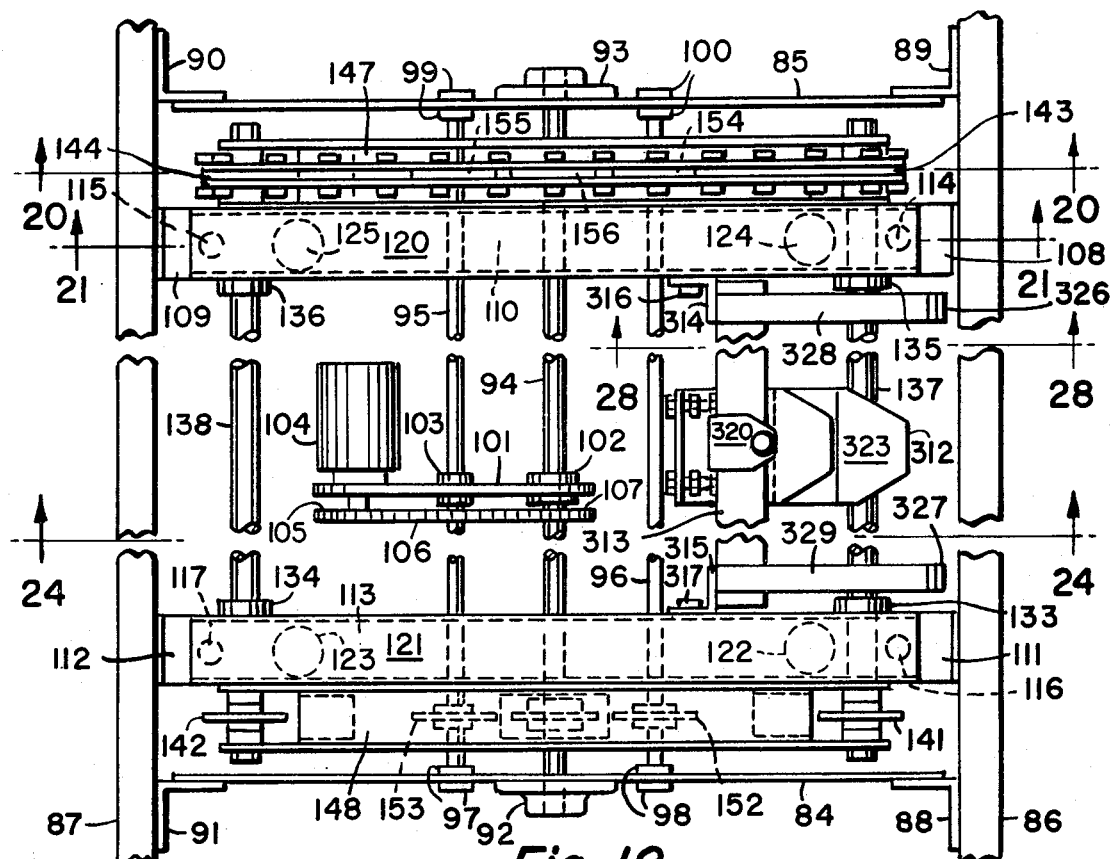
FIG. 19 (Sheet 10) is a plan view of the central portion of the transfer mechanism.
Figure 20:
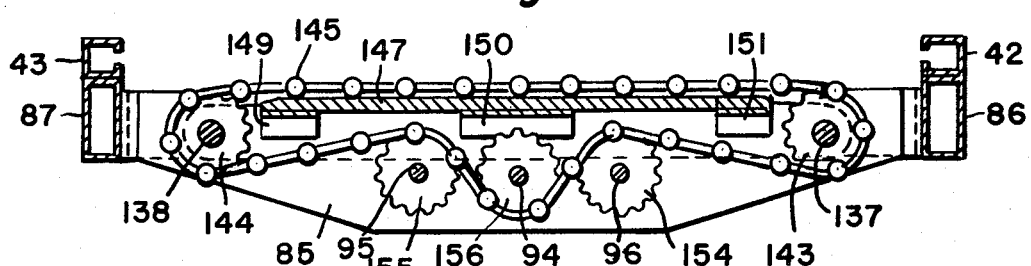
FIG. 20 (Sheet 10) is an end view of the mechanism shown in FIG. 19.
Figure 34:
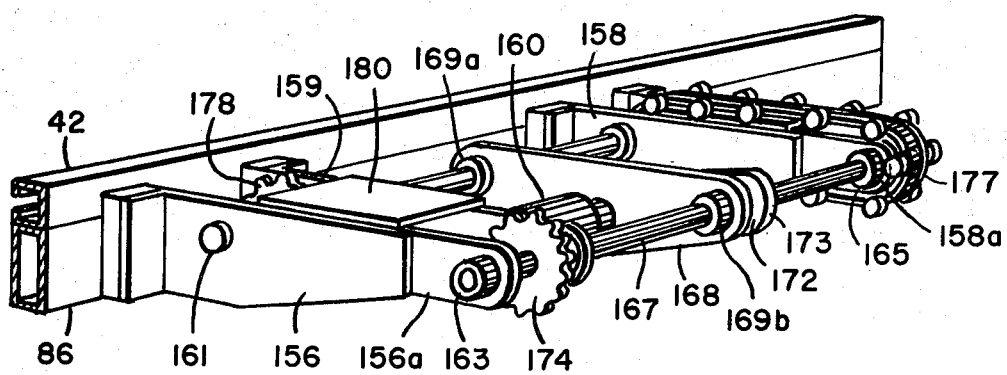
FIG. 34 (Sheet 13) is a perspective view of the upper rear transfer mechanism.
Figure 35:
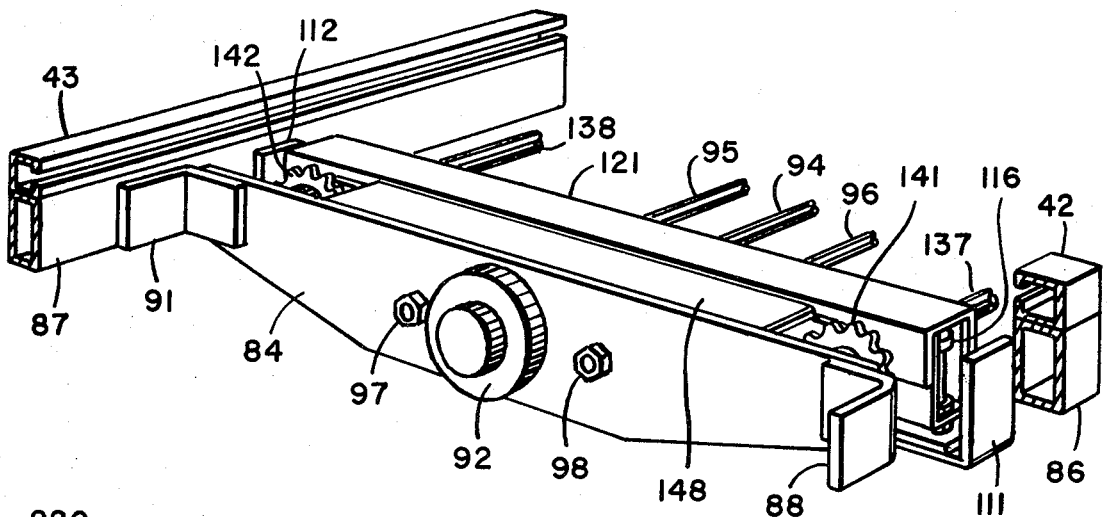
FIG. 35 (Sheet 13) is a perspective view of one of the two similar support structures of the central upper transfer mechanism.

The mechanism for shifting the work-support assemblies 55 laterally with respect to the conveyor to present them at the loading station 83 is shown in FIGS. 19–23 (Sheet 10), FIGS. 16–18 (Sheet 9), and in FIGS. 34–35 (Sheet 13). The functioning of the conveyor 17 is such that the carrier frame 41 is capable of movement to the right, as viewed in FIG. 3, to the point where it is positioned centrally opposite the loading station 83. This position places the carrier frame directly over the mechanism illustrated in FIG. 19. The functioning of this mechanism is to lift the work-support assembly resting on the carrier 41, and then transfer it laterally across to the loading station 83. The direction of this movement is selectively under the control of the operator. The position of the work-support assembly, as brought by the conveyor, is illustrated in FIG. 13 (Sheet 8). The structure responsible for the lateral shifting movement is shown in FIG. 19 and includes the transverse beams 84 and 85 secured to the main frame rails 86 and 87 of the machine by the brackets 88–91. The beams 84 and 85 are provided with the bearing blocks 92 and 93, respectively, rotatably supporting the shaft 94. The fixed shafts 95 and 96 are secured to the beams 84 and 85 by nut assemblies 97–100. A plate 101 has a bearing block 102 riding on the shaft 94, and another block 103 engaging the fixed shaft 95. A motor 104 is fixed with respect to the plate 101, and carries a sprocket 105 driving a chain 106 to transfer power to the sprocket 107 fixed to the shaft 94.

Figures 21, 22:
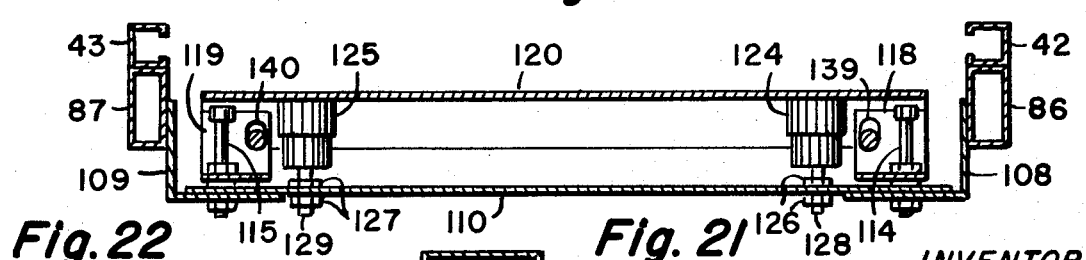
FIG. 21 (Sheet 10) is a view on the plane 21—21 of FIG. 19.
FIG. 22 (Sheet 10) is a sectional view on an enlarged scale of the lifting cylinder associated with the mechanism shown on FIG. 21.

Referring particularly to FIGS. 19 and 21 (Sheet 10), a pair of brackets 108–109 secured respectively to the frame rails 86 and 87 support the transverse bar 110. A similar pair of brackets 111 and 112 support a corresponding bar 113. Locating bolts 114–117, together with a pair of nuts associated with each of these bolts, secure the bars 110 and 113 to their respective brackets. A third nut engaging each of these bolts secures the U-shaped locating clips 118 and 119 (and a similar set of clips associated with the bar 113). The clips are received within the inverted channel beams 120 and 121. The elevating cylinder assemblies 122–125 are adjustably mounted on the bars 110 and 113 through the pairs of nuts as shown at 126 and 127 in FIG. 21 engaging the threaded shanks 128 and 129 associated with these cylinder assemblies.

Figure 23:
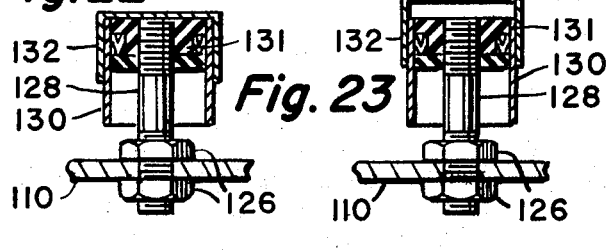
FIG. 23 (Sheet 10) is a view of the cylinder assembly shown on FIG. 22, in the actuated condition.

The details of construction of these assemblies are shown in FIGS. 22 and 23. A shell 130 is secured to a seal assembly 131 to form a fixed piston mounted on the member 128, and the cylinder 132 slides on the outer surface of the shell 130. Air pressure admitted above the seal assembly 131 will shift the assembly from the FIG. 22 to the FIG. 23 position. This air is admitted through a conventional conduit (not shown), a tube connected to the cylinder 132, or by the use of a tubular shank 128, in which case the connection can be made at the underside of this member. The effect of such air pressure is to elevate the U-shaped beams 120 and 121. These beams are provided with bearings 133–136 carrying the shafts 137 and 138. The vertical movement of these shafts resulting from the elevation of the beams 120 is accommodated by elongated openings as shown at 139 and 140 in the clips 118 and 119 in FIG. 21. Since these shafts intersect the locating clips as well as the channel beams 120 and 121, the effect is to provide a lateral positioning of the channel beams with respect to the remaining structure. The adjustment of the height of the locating bolts 114–117 serves to provide a limit stop establishing the lower-most position of the beams 120 and 121.

The shafts 137 and 138 are provided with sprockets 141–144 at their opposite ends, respectively, carrying the specialized chains 145 and 146. These chains move across the shelves 147 and 148 secured respectively to the beams 120 and 121 by brackets are shown at 149–151 in FIG. 20. The chains also traverse the idler sprockets 152–155 carried by the shafts 95 and 96, as well as the sprocket 156 driven by the power shaft 94. A movement of the top course of the chain 145 is thus imparted across the supporting shelves 147 and 148. These become effective when the beams 120 and 121 are elevated so that they can lift the work-support assemblies 55 off the carrier frame 41 of the conveyor 17. The configuration of the carrier frame is such that the mechanism shown in FIG. 19 is received within a central space between the cross members 41a and 41b (referring to FIG. 3).

The mechanism described in connection with FIGS. 19 through 23 is capable of transferring the work-support carriers over to the work station 83, or of moving it in the opposite direction. It often becomes desirable to shift one of these work-support assemblies out of the way so that the carrier can complete its motion without interference. The transfer of the work-support assemblies to the rear is facilitated by the mechanism shown in FIG. 34 (Sheet 13), which receives these work-support assemblies from the upper central transfer mechanism previously described. The details of this mechanism are most clearly shown in FIGS. 16–18 on Sheet 9.

The pairs of cantilever arms 156–157 and 158–159 are secured to the frame rail 86, as shown in FIG 16. The fixed shaft 160 traverses the arms 157 and 158, and is secured to the arms 156 and 159, respectively, by the cap screws 161 and 162. Bearings 163 and 164 in the arm extension 156a and 157a, respectively, and the bearings 165 and 166 in the arm extension 158a and 159a, respectively, rotatably support the shaft 167. A plate 168 is provided with collars 169a and 169b engaging the shafts 160 and 167, respectively, and the motor 170 is supported by this plate. The sprocket 171 on the motor shaft drives the sprocket 172 on the shaft 167 through the chain 173. Sprockets 174 and 175 at the opposite ends of the shaft 167 drive the chains 176 and 177, which also pass over the idler sprockets 178 and 179 mounted on the opposite ends of the fixed shaft 160. These chains pass over the pads 180 and 181 secured to the pairs of cantilever arms, respectively, which transfer the load carried by the chains over to the supporting structure of the machine. These chains are identical in construction to those associated with the central transfer mechanism, and are shown in detail in FIGS. 60–62 on Sheet 23. An otherwise conventional link chain 182 is provided with pairs of rollers as shown at 183–184 at every third cross pin. These cross pins, of course, are of a sufficiently extended length to accommodate the axial thickness of the rollers. It should be noted here that the rate of movement of an object carried by the chain will be twice the linear velocity of a chain itself, as a result of the rotation of the rollers on the supporting pads. The mounting of the rollers on the extended pins indicated at 185 is conventional, and normally would include the use of cotter pins as shown at 186 and 187. Washers would normally be used to isolate the rollers 183 and 184 from the cotter pins and from the side links of the chain.

Figure 14:
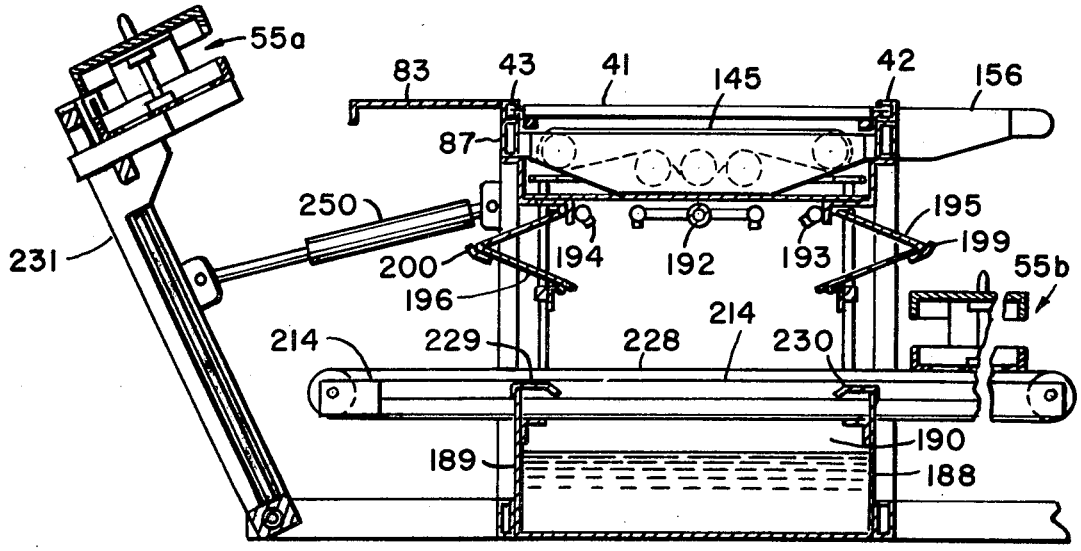
FIG. 14 (Sheet 8) is a view similar to FIG. 13, with the mechanism in a position preparatory to lowering the work-supporting frame to the lower transfer level for passage through the mask-washing station.
Figure 15:
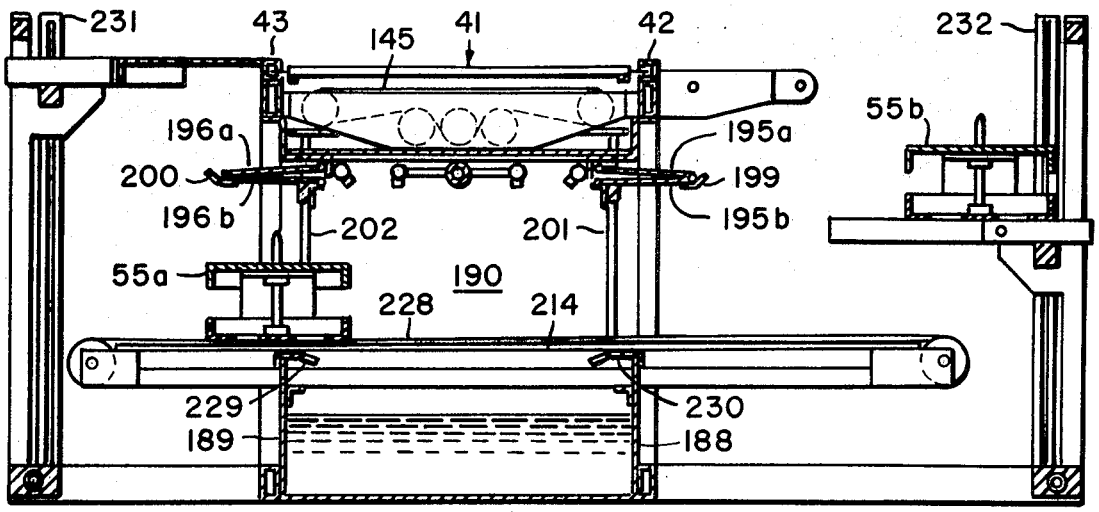
FIG. 15 (Sheet 9) is a view on the same plane as that of FIGS. 13 and 14, showing the transfer mechanism in an intermediate position.

The space underneath the conveyor opposite the loading station is utilized for a mask-washing installation. After repeated passages of the work-support assemblies through the spray station, it is inevitable that paint will accumulate over the mask and the work-support frame. These accumulations must be removed periodically with solvent. The equipment for performing this operation is best illustrated in FIGS. 13–15 on Sheets 8 and 9. The side walls 188 and 189, together with the transverse panels 190 and 191 (FIG. 3), define a solvent spray chamber in which the lower portion functions as an accumulation tank for the storage of solvent. Spray nozzle assemblies 192–194 are provided with solvent under presure by a conventional pumping system (not shown), and these spray guns are mounted to project jets of solvent against the exposed surfaces of a mask-support assembly in the position shown in FIG. 13. A pair of opposite doors 195 and 196 are mounted in the openings through which the work-support assemblies enter and leave the spray chamber. Each of these doors is a pair of panels hinged on a horizontal axis at 197 and 198, respectively, and these hinges are covered by flexible flaps 199–200 to confine the solvent vapors within the chamber. The doors are shown in FIG. 13 in the closed position, in an intermediate position in FIG. 14, and in the fully open position in FIG. 15. These doors are actuated by the screws 201 and 202 by pivotally securing the lower extremities of the doors to the nuts 203 and 204, which are in threaded engagement with the screws 201 and 202, respectively. The sprockets 205 and 206 are secured to the screws, and are driven by the chain 207 as shown in FIG. 8. A similar arrangement is provided at the opposite end of the doors, where the sprockets 208 and 209 drive a similar pair of screws. Idler sprockets 210 and 211 determine a convenient path of movement for the chain 207, leading it to drive sprocket 212 associated with the motor 213 mounted on the end panel 191. The control rotation of this motor will therefore operate to open and close the doors to the washing chamber.

Figure 36:
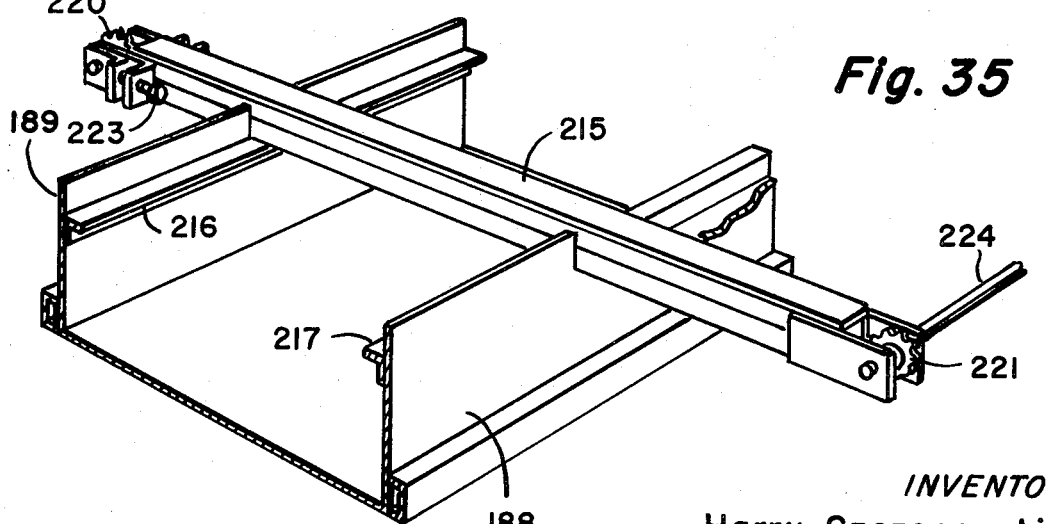
FIG. 36 (Sheet 13) is a perspective view of the central support structure of the lower transfer mechanism.
Figure 60:
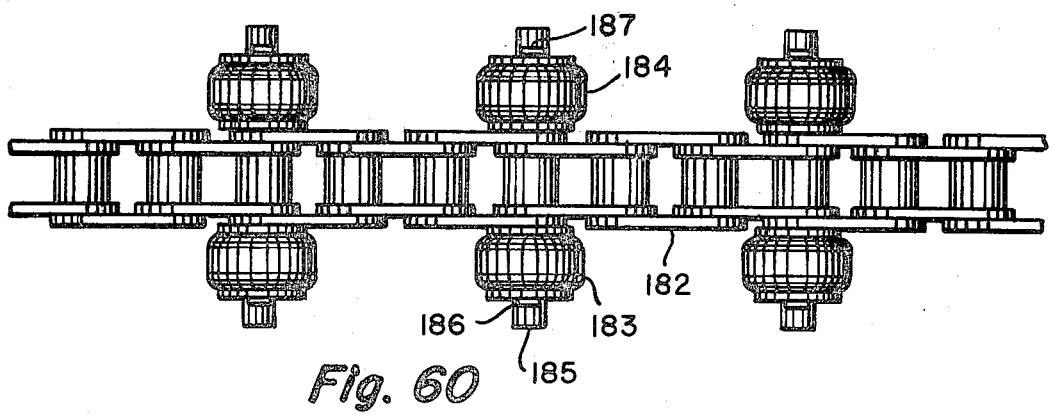
FIG. 60 (Sheet 23) is a plan view of the special transfer chain used in both of the modifications of the machine.
Figure 61:
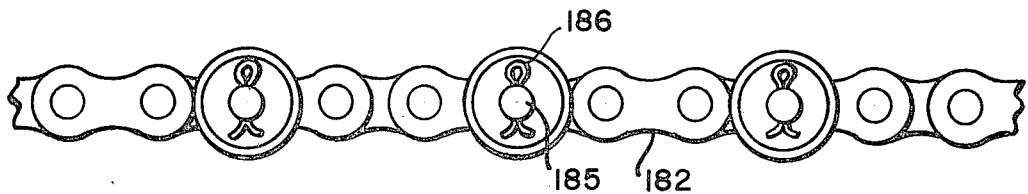
FIG. 61 (Sheet 23) is a side view of the chain shown in FIG. 60.
Figure 62:
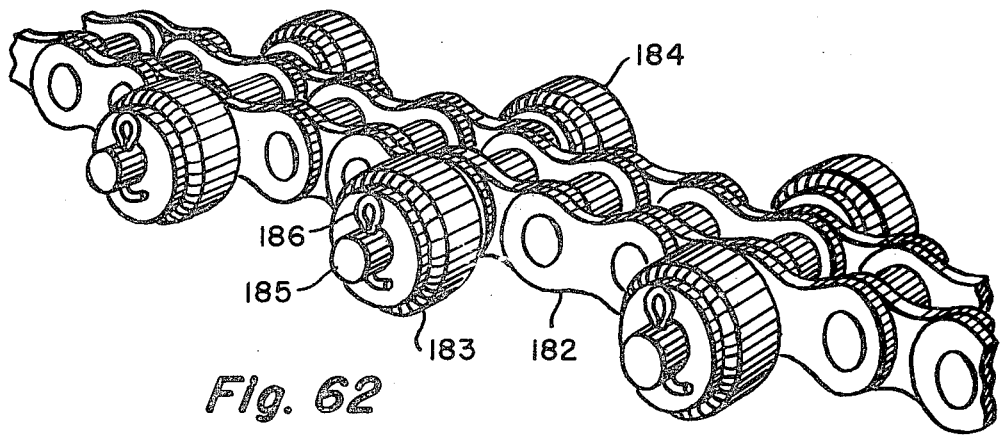
FIG. 62 (Sheet 23) is a perspective view of the chain shown in FIGS. 60 and 61.

FIGS. 29 and 30 (Sheet 12) illustrate the lower transfer mechanism responsible for transporting the work-support assemblies between the positions shown in FIGS. 13–15. The transverse rails 214 and 215 are secured to the side walls 188 and 189 with brackets 216 and 217. The opposite ends of these rails are provided with sprockets 218–219, and 220–221, respectively, with the sprockets 218 and 220 mounted on conventional chain-tightening devices 222 and 223. The sprockets 219 and 221 are secured to the shaft 224 driven by the motor 225 through the sprockets 226 and 226a, and the chain 227. Conveyor chains 228 of a construction similar to that shown in FIGS. 60 and 61 are carried by both the rails 214 and 215, with the power assembly assuring identical movement at the opposite ends of the work-support assemblies bridging across between these two chains, in the positions shown in FIGS. 13–15. One of the rails, without the associated chain, is illustrated in perspective in FIG. 36. To assist in the confinement of solvent to the inside of the washing chamber, it is preferable to include the drain plates 229 and 230 to urge the spray droplets and possible condensate back into the central area of the tank, past the structure shown in FIGS. 36, 29, and 30.

The movement of the work-support assemblies between the upper and lower transfer mechanisms is accomplished by the elevators 231 and 232. The front elevator 231 has a frame 233 (FIG. 3) pivotally connected to the extensions 234–235 of the main frame by the shaft 236. The frame 233 includes the guideways 237–240, and one course of a chain moves within the guideways 237 and 240. The return course of these chains moves within the tubular members 241 and 242, respectively, and corresponding courses of these chains are secured to the opposite ends of the bar 243. The cantilever arms 244 and 245 are slideably mounted on the guideways 238 and 239, and are carried by the bar 243. The power to operate the lifting mechanism is delivered to the shaft 236 by the chain 246 moving within the housing 247, and the chain 246 may either be driven by an independent motor (not shown), or by a controllable power take-off associated with another power source.

The main function of the front elevator mechanism is illustrated best in FIG. 14. Since the cantilever arms 244 and 245 intersect the work station 83, cutout areas 248 and 249 are provided to receive the outer extremities of these arms. When the unit is in the position shown in FIG. 13, a work-support assembly can be moved from the position of the assembly 55a over onto the loading station 83, and it may be pulled manually beyond that point over to the frame 233. Actuation of the air-hydraulic units 250 and 251 by conventional controls (FIG. 3) operated by one of the control buttons 252 (and its corresponding mate in the group 253) will move the elevator from the FIG. 13 to the FIG. 14 position. This movement establishes clearance with respect to the work station 83, and lifts the work-support assemblies free of the surrounding structure. Actuation of the elevator mechanism by another one of the buttons 252–253 will move the work-support assembly down on to the lower transverse conveyor, which can then move it into the spray chamber as shown in FIG. 15. The rear elevator 232 is similar in construction to the front elevator 231, except that the rear elevator guideways remain vertical, and the cantilever arms 232a and 232b are respectively pivotally connected to the brackets 254 and 255 as shown on 256 and 257 in FIG. 3. A cylinder mechanism of the type shown in FIGS. 21 and 22 (Sheet 10) in each of the brackets 254 and 255 controls the angular attitude of the arms 232a and 232b about the hinge pins 256 and 257, with the result that a work-support assembly in the position shown at 55b in FIG. 15 (after moving upwardly to a position slightly above the upper lateral transfer level)

can be tilted downwardly so that it slides off onto the lateral conveyor system.

The operator's work at the loading station 83 is simplified by the presence of the jack assemblies 258 and 259. The masks 57 of the FIG. 49 assembly (Sheet 18) are frequently of considerable weight, and these must be removed from the remainder of the structure each time a workpiece is inserted in the "nest" mounted on the base 56. The details of these jacks are shown in FIGS. 46–48 (Sheet 17). A bottom plate 260 is mounted on the loading station shelf 83. This bottom plate, together with a similarly-shaped top plate 261, secure the opposite ends of the rods 262–265. The bottom and top plates are also provided with bearings as shown at 266 and 267 for rotatably receiving the lifting screw 268. This screw intersects the bottom plate 260 and also the loading station shelf 83, and is driven by a conventional motor (not shown) mounted adjacent the underside of the shelf. A bracket 269 has a nut portion 270 in threaded engagement with the screw 268, and also has a lifting projection 271 preferably provided with the pads 272 and 273 for receiving the edges of the masks 57. The rod 264 functions as a guideway, and the bearing pads 274–277 are mounted within the tubular portion 278 of the bracket 269 for interengagement with the guide rod 264. Stabilizing pads 279 and 280 engage the rods 263 and 265, respectively, to produce a very simple guideway-follower system that can be manufactured without close tolerances. These jack units are mounted on the loading station shelf 83 in a predetermined position such that the lowered condition of the jack shown in FIG. 3 (Sheet 3) will result in the placement of the projections 271 directly under the side flanges of the mask unit 57 as the work-support assembly moves laterally off the upper transfer system from the central conveyor. The vertical portion 281 of the bracket 269 serves as an abutment preventing accidental lateral placement of the masks with respect to the surrounding structure.

Figure 2:
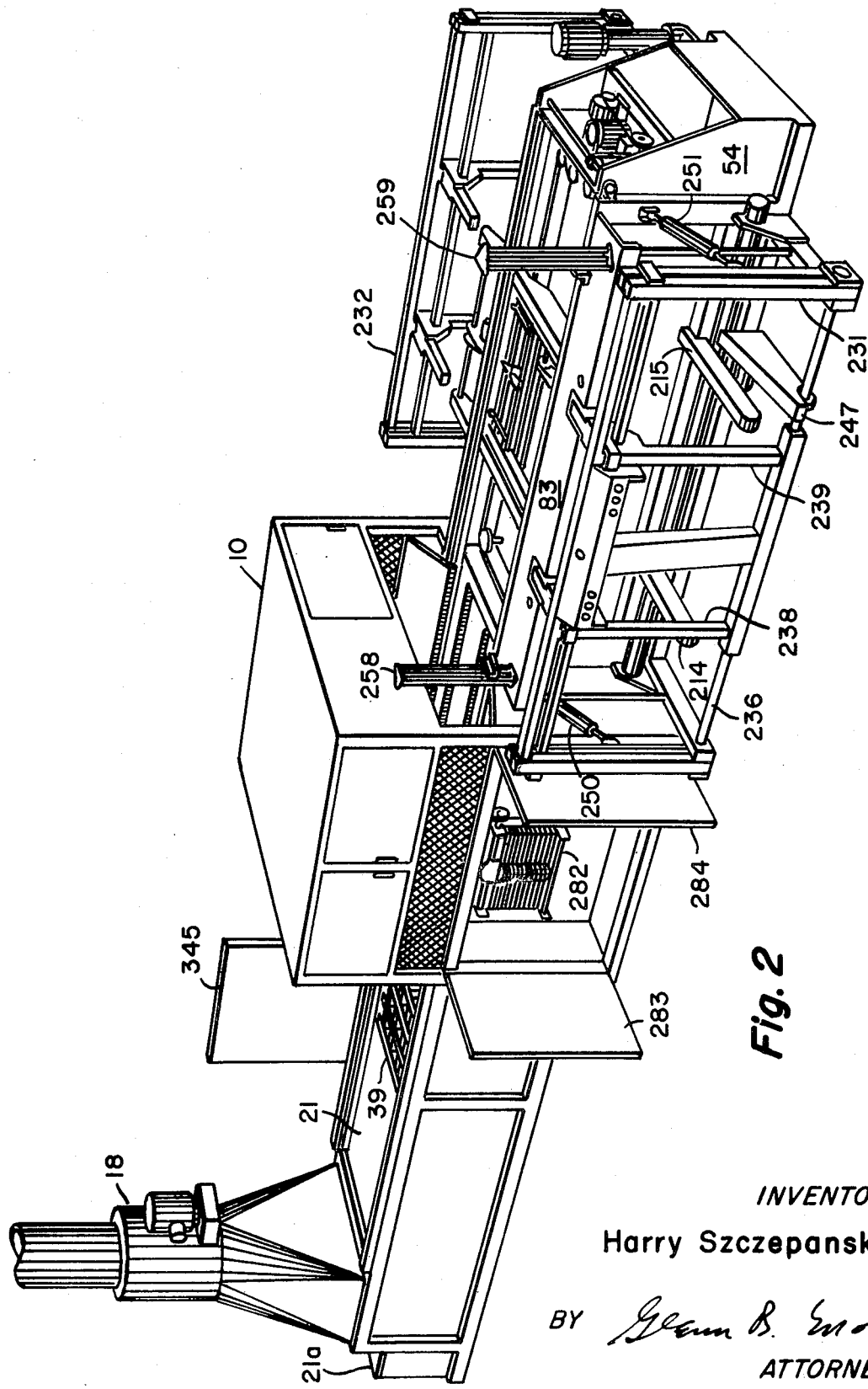
FIG. 2 (Sheet 2) is a perspective view similar to FIG. 1, with the super structure at the right-hand portion of the machine removed to expose the mechanism, and with the doors opened to expose the automatic control device.
Figure 42:
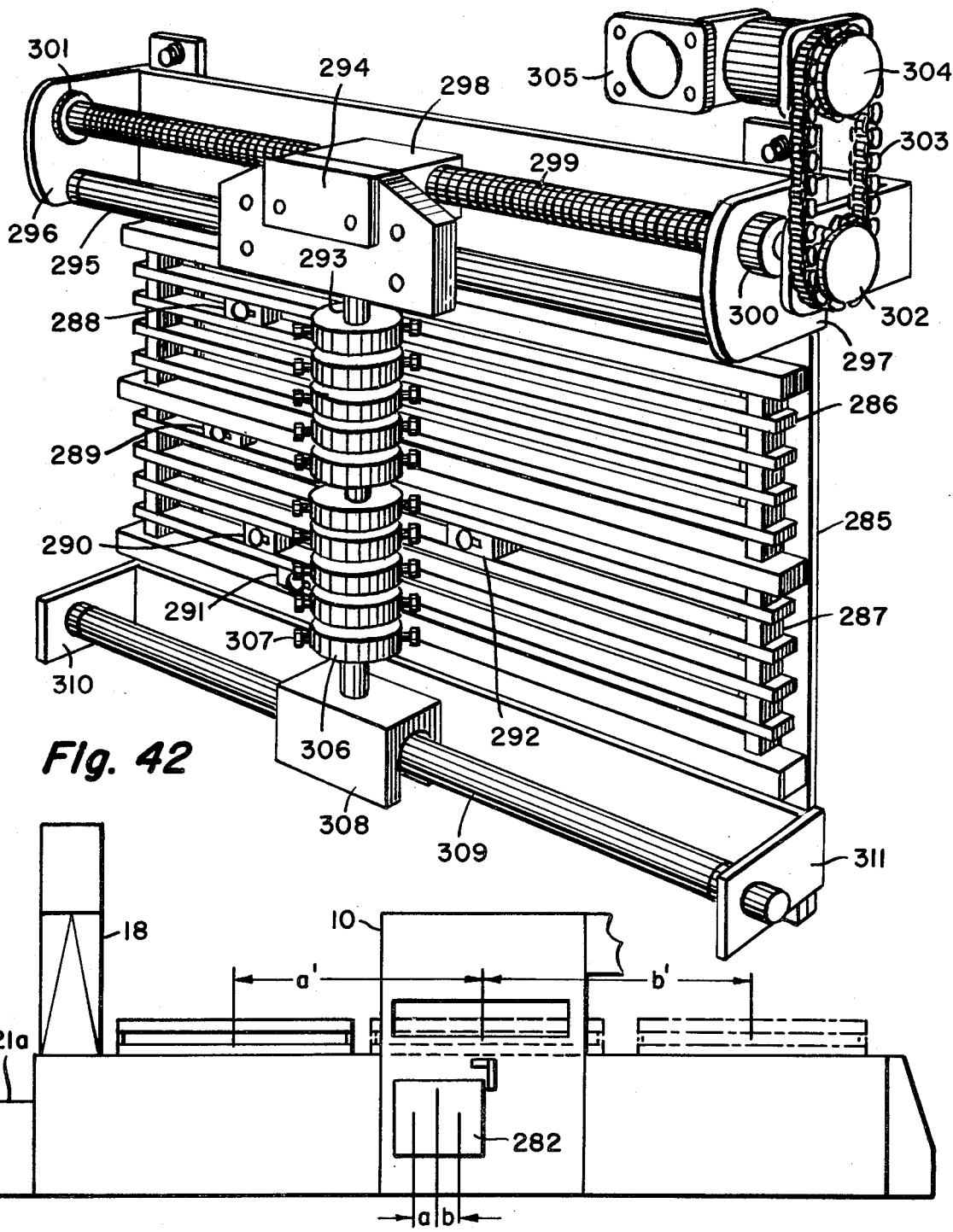
FIG. 42 (Sheet 15) is a perspective view of the controller for establishing the cycle of the painting operation.
Figure 43:
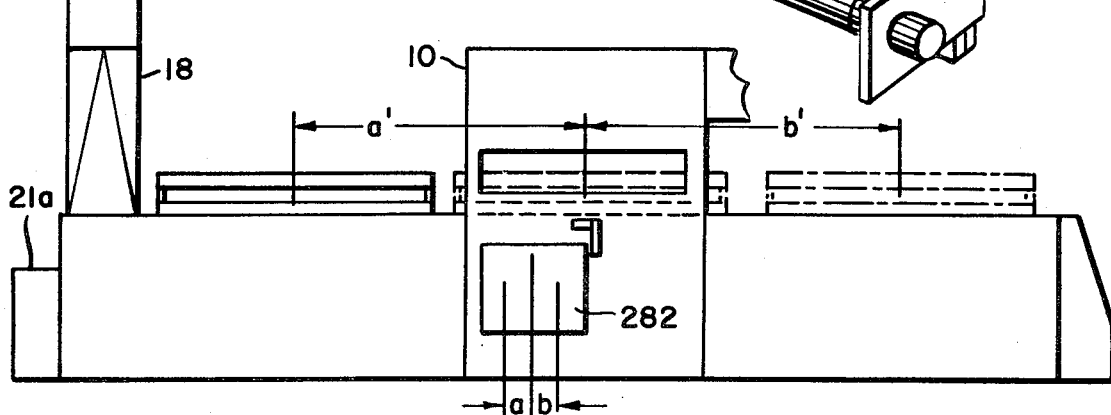
FIG. 43 (Sheet 15) is a diagram illustrating the relationship between the functioning of the controller and the movement of the conveyor system of the machine.

The control of the transfer systems and the mask-washing equipment is preferably manually actuated through the use of push buttons similar to those shown at 252 and 253 in FIG. 3, but the paint-application operation is fully automated according to the particular job for which the machine has been set up and programmed. The efficient application of paint spray requires carefully interrelation between the movement of the conveyor through the spray station, together with the operation of the various spray guns over timed intervals. These relationships must be maintained with accuracy and uniformity, and established in the machine as a complete program without requiring extensive effort. Whenever the production job being handled by the machine is changed, it is obvious that the spraying program, together with the work-support nests and the masks, will change with it. The control mechanism for establishing the spraying operations is shown in FIG. 42 (Sheet 15), and its relationship to the conveyor system is illustrated in the schematic diagram of FIG. 43. The controller generally indicated at 282 (referring to FIG. 2, Sheet 2) is mounted in a cabinet section of the housing 10 behind the doors 283 and 284. The unit itself includes a base plate 285 functioning as a frame to maintain the relative alignment of the components. A series of parallel mounting rails 286 is secured to the base plate 285, the rails being separated from each other by spacers 287. These mounting rails provide for the adjustable placement of the detector elements 288–292. These elements may be adjustably secured at any position along the rails 286, and may be switches, valves, or some other form of detector. One end of a shaft 293 is mounted on the carriage 294 supported by the guide rod 295. This rod is secured to the brackets 296 and 297 attached to the base plate 285. A nut 298 secured to the carriage 294 engages the screw 299 carried in the bearings 300 and 301, which are also secured to the brackets 296 and 297. A sprocket 302 rotates the screw 299 with power received through the chain 303 from the sprocket 304 of the speed-reducer 305. This speed-reducer is driven directly by the conveyor chain 44 by a convenient sprocket (not shown) mounted within the housing 10. The combined effect of the speed reducer 305 and the screw 299 is to produce a linear movement of the carriage 294 in a predetermined ratio with respect to the movement of the conveyor. A movement of the controller carriage 294 of one inch, for example, for each foot of movement of the conveyor is a convenient arrangement. One or more of the rails 286, or a similarly-placed parallel measurement rail, are preferably equipped with indicia giving an exact linear relationship between the position of the carriage, the detectors, and the conveyor.

The shaft 293 carries a series of eccentric actuating cams 306 rotatably mounted on the shaft, and lockable in any desired angular position about the shaft by the set screws 307. In one position in which these actuating cams may be placed, clearance exists over the detectors. In another position, the detectors will be actuated by the cams as the carriage moves along over the rails 286. The position of the detectors along the rails at the point where they are actuated by the various cams will determine the events in the spray program. The programming instructions to the workman associated with each production job will contain a list of the placement locations of each of the detectors, and will further give instructions as to whether the actuating cams are to be placed in the active or retracted position. The presence of the bearing shoe 308 on the lower end of the rod 295 stabilizes the position of the shaft 293, as a result of sliding interengagement with the rod 309 carried by the brackets 310 and 311 secured to the base plate 285.

This mechanism assures a proportional ratio between the linear movement of the controller carriage 294 and the main conveyor of the machine. The dimensions indicated in FIG. 43 at (a) and (a'), and (b) and (b') reflect exactly this ratio. Instructions for programming the machine to accommodate a particular production job will include the placement dimensions for each of the detectors, and instructions as to whether the actuating cams are to be mounted in the active or retractive positions. For example, one of the detectors may be associated with a particular spray gun, another with the holding of the conveyor movement for a predetermined length of time, another actuator with a different spray gun mechanism, and so forth. The entire program can be counted upon to repeat itself with accuracy at each cycle of operation of the machine. This initiation of the cycle is preferably under the control of the operator.

Figure 24:
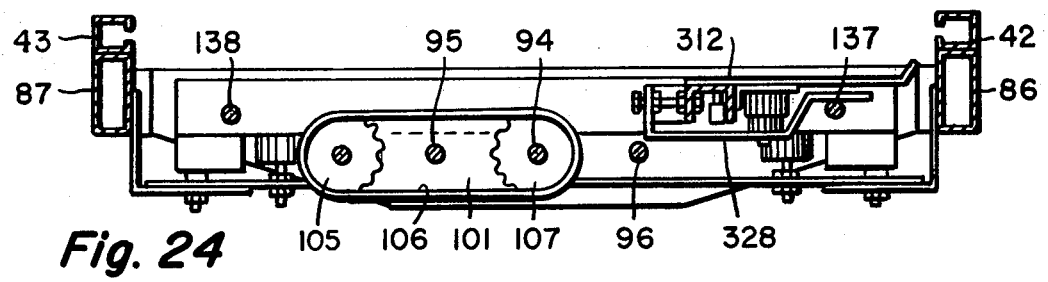
FIG. 24 (Sheet 11) is a sectional elevation on the plane 24—24 of FIG. 19.
Figure 25:
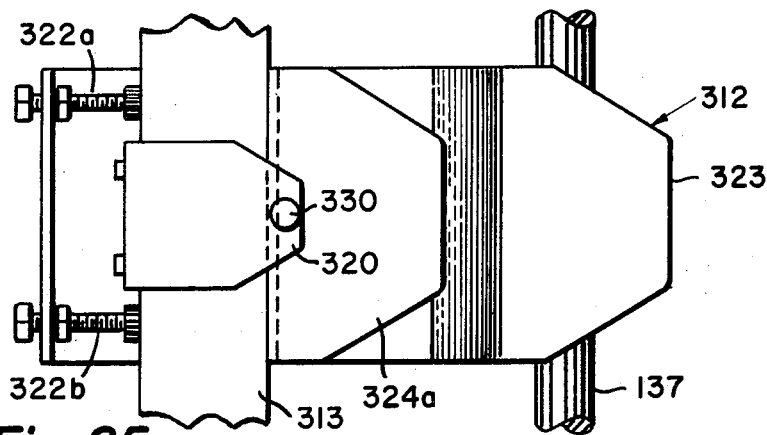
FIG. 25 is a plan view on an enlarged scale of the position detector shown in FIG. 19.
Figure 26:
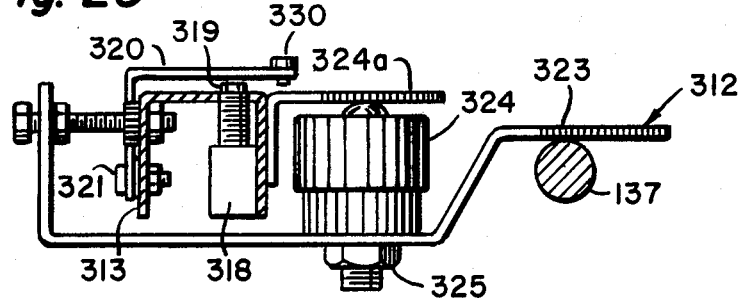
FIG. 26 (Sheet 11) is a view in elevation of the mechanism shown in FIG. 25.
Figure 27:
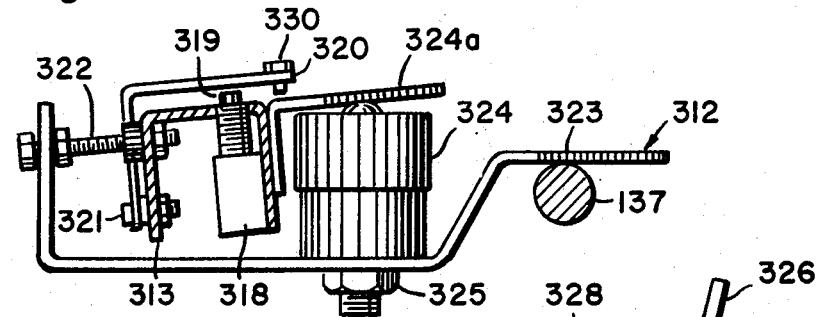
FIG. 27 (Sheet 11) is a view similar to FIG. 26, showing the mechanism in the actuated condition.

Arrangements are provided for coordinating the transfer systems with the elevators and with the main conveyor. The detection-alignment assembly illustrated in FIGS. 25–28 (Sheet 11) is positioned in the intersection area of the upper transfer system with the central conveyor as illustrated in FIG. 19. The assembly indicated at 312 in FIG. 24 includes a channel-shaped beam 313 with end brackets 314 and 315 preferably welded to it. These brackets are pivotally connected to the beams 120 and 121 at the pins 316 and 317. A switch or valve 318 is secured to the beam 313 as shown in FIGS. 26 and 27, with the actuator 319 projecting above the beam 313 to a position where it can be operated upon by the detector arm 320. This arm is flexibly attached to the beam 313 by the fastening assembly 321. A bolt 322 is also secured to the beam 313, and flexibly supports on offset arm 323, the end of which rests on the shaft 137. A cylinder assembly 324 is secured to this arm by the nut 325. The construction of the cylinder assembly is similar to that illustrated in FIGS. 22 and 23 (Sheet 10). Actuation of the cylinder 324 shifts the device from the FIG. 26 to the FIG. 27 position through force applied to the shelf 324a secured to the beam 313, and carries the stop arms 328 to the position shown in FIG. 28. When raised to this position, the ends of these arms provide an abutment against which the transfer mechanism can move the work-support assemblies with a continuing pressure, and thus align the assemblies directly with the conveyor. If a particular work-support assembly happens to be placed on the transfer system in a slightly skewed position, the transfer chains will continue to operate until both ends of the base of the work-support assembly have made contact with the upwardly-bent ends 326 and 327 of the arms 328 and 329. The button 330 on the actuator 320 is positioned such that it actuates the detector only when the work-support assembly is in a position corresponding to full contact with the ends 326 and 327 of the arms. It is only when the signal from the detector mechanism is thus established that the conveyor is freed to begin the movement toward the spray chamber. Lowering of the cylinder 324 will bring the arms 328 and 329 downwardly to a retracted position permitting the passage of the work-support assemblies over on to the side extension of the transfer mechanism, toward the rear elevator.

Figure 12:
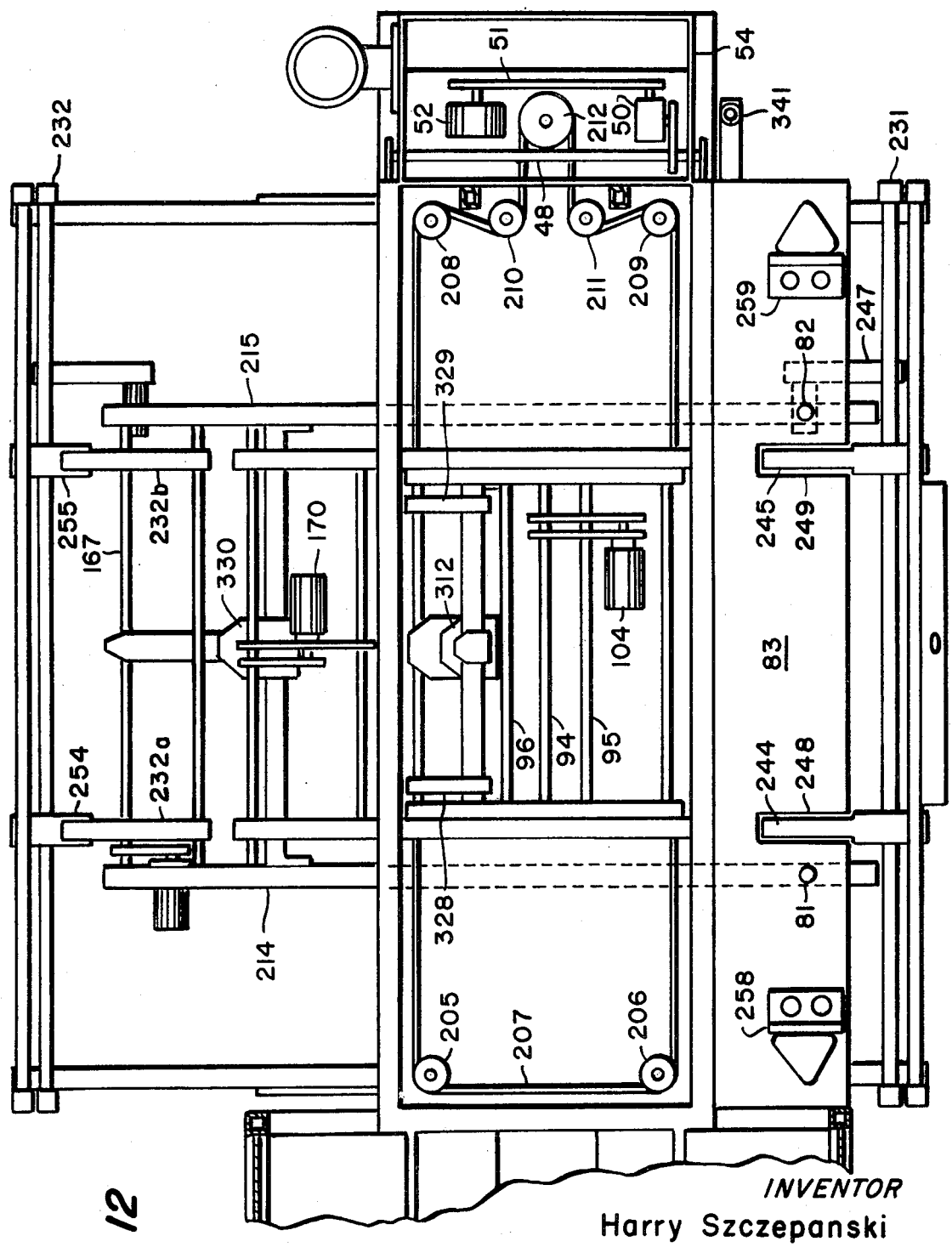
FIG. 12 (Sheet 7) is a plan view of the mechanism shown in perspective in FIG. 3.
Figure 28:
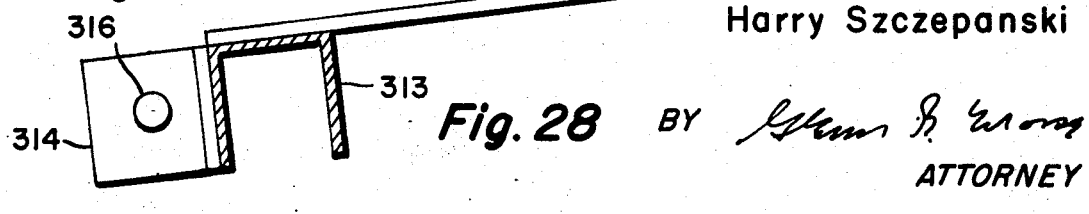
FIG. 28 (Sheet 11) is a sectional elevation on an enlarged scale on the plane 28—28 of FIG. 19, limited to the showing of the stop arm positioned according to FIG. 27.

The assemblies generally indicated at 330 (FIG. 12) are installed on the lower transfer mechanism to perform a similar function to that of the assembly 312 and is substantially identical to that illustrated in FIGS. 26–28 (Sheet 11). Actuation of the 330 mechanism from the FIG. 32 to the FIG. 33 position raises the arms 331 and 332 secured to the beam 333, so that the upturned ends 334 and 335 function as abutments to induce the proper alignment of the work-support assemblies, and halt their movement in the direction of the rear elevator. Actuation of the detector device associated with the 30 mechanism provides a signal which can be correlated with the elevator position, and with the other components of the machine to indicate the presence of a work-support assembly at that position.

Figure 4:
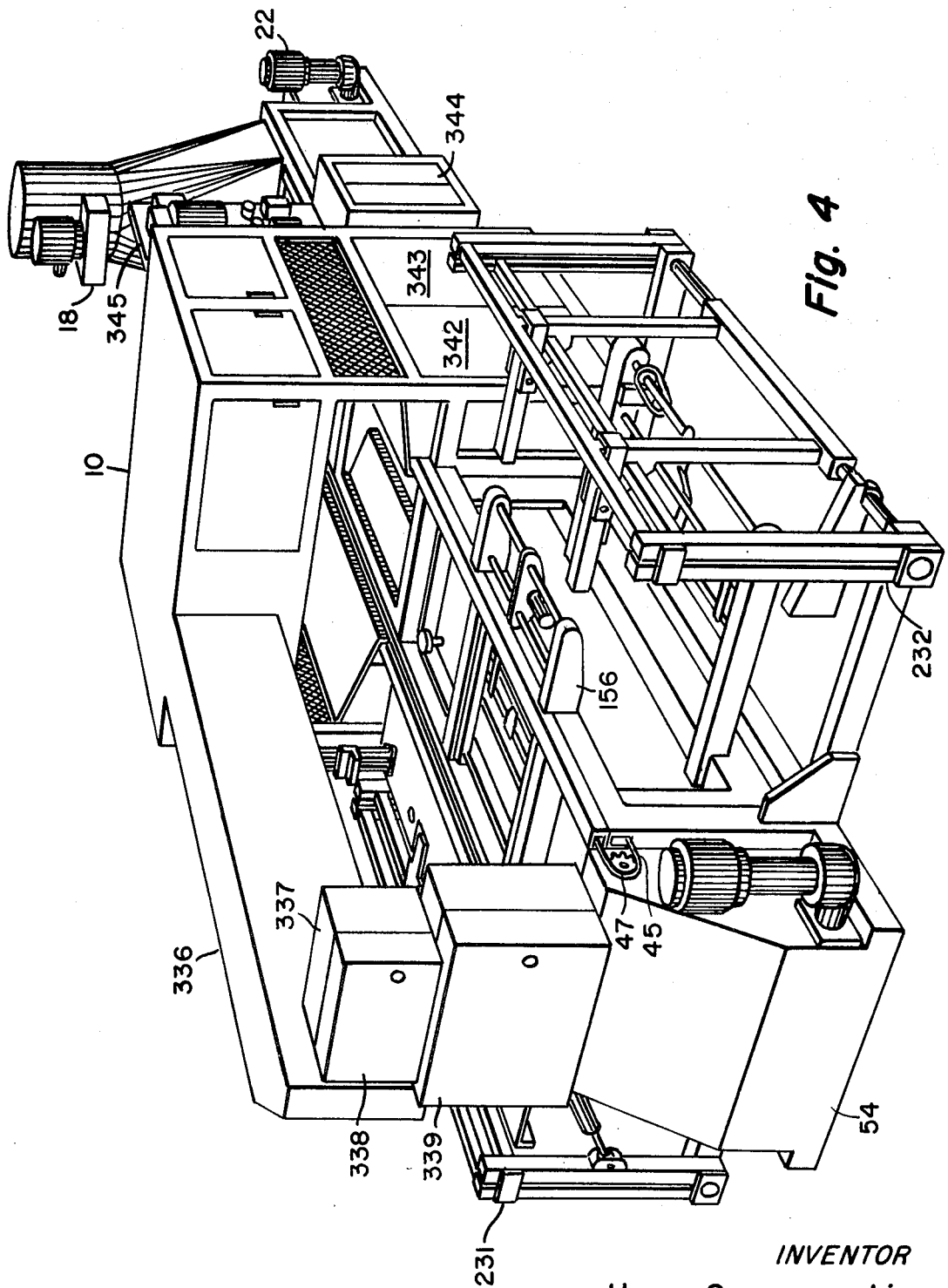
FIG. 4 (Sheet 4) is a perspective view from the rear of the right-hand portion of the machine as viewed in FIG. 1, on an enlarged scale.

Referring to FIGS. 1 and 4 (Sheets 1 and 4), the overhead box structure 336 is secured to the housing 10 and to the upright cabinet structure 337 at the right end of the machine, as viewed from the operator's station. The space within the structure 337 is utilized as junction boxes, and is covered by the doors 338 and 339. The overhead structure 336 provides a convenient position to display the various instruments indicating the conditions of air pressure and other variables within the machine. A group of service connections 340 are positioned in close proximity to the spray chamber; and the control lines, the air supply, and the paint supply to the spray gun systems, as well as the electrical power to any moving gun assemblies, can be plugged in easily at these points. This arrangement facilitates the use of complete sub-assembly systems for the spray gun equipment that can be left intact for a particular production job, and installed as one unit within the housing 10. Conduit ducts are preferably incorporated in the machine as shown at 341 (FIG. 12) to protect wires and tubing. The space within the housing 10 immediately under the inclined water-wash shelves is utilized to accommodate the controller (at the front of the machine), and as a junction cabinet (at the rear of the machine). The doors 342 and 343 may be provided to enclose the area at the rear of the machine to protect the components mounted in this space. The cabinet 344 is also provided to house the conventional air and hydraulic equipment, some of which is preferably mounted on the vertical panel 345, where a greater degree of access is desirable.

The modified form of the machine shown in FIGS. 56–59 is mechanically similar to the machine previously described. The suction duct system 346, however, is placed at the rear of the modified form of the machine, communicating with the underside of the spray chamber housing 347 via the duct 348. The resulting draft pattern is illustrated in FIG. 55 (Sheet 19). The section of the machine indicated at 350 in FIG. 56 (Sheet 20) is provided for the run-out of the conveyor, and the space underneath it can be used for any convenient purpose. This modification of the machine is otherwise similar in construction to that previously described.

Figure 41:
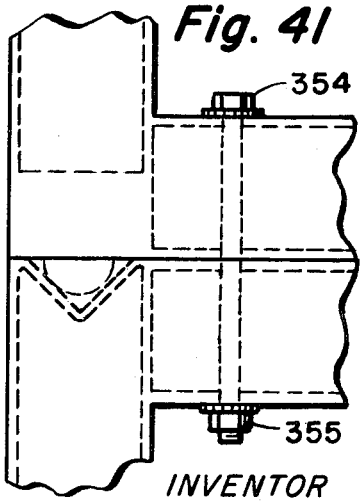
FIG. 41 (Sheet 14) shows the interengagement of the structures shown in FIGS. 39 and 40.
Figure 44:
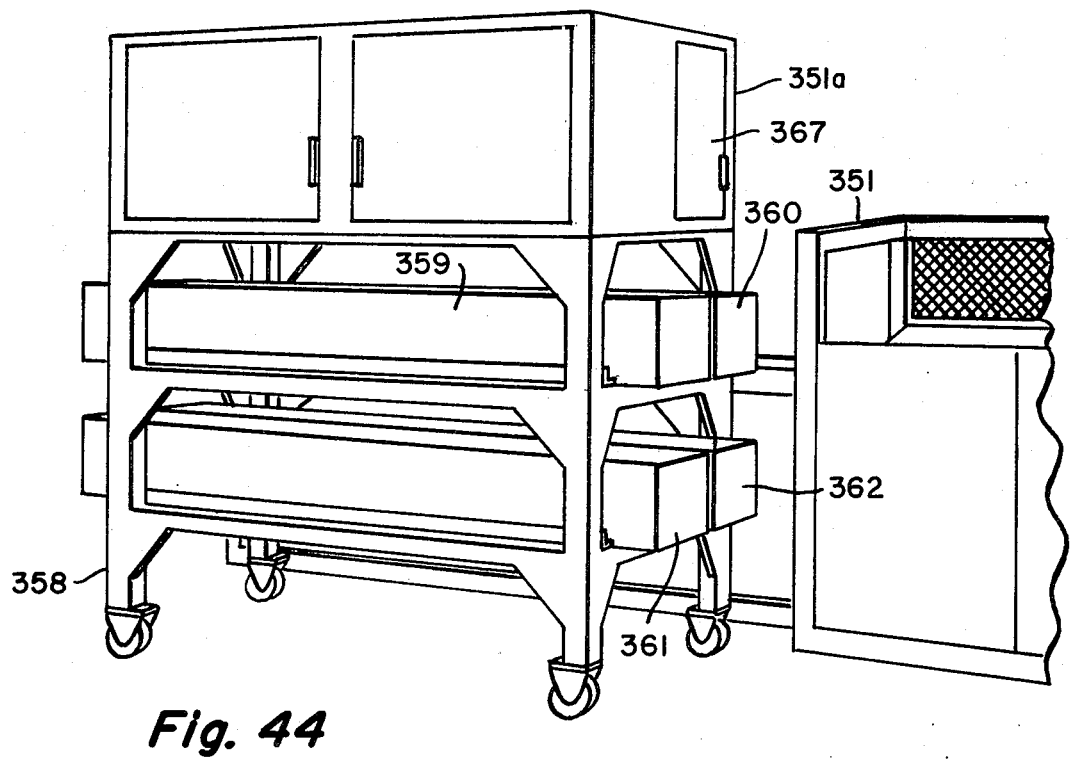
FIG. 44 (Sheet 16) is a view of a specialized carrier for transporting a spray-mechanism module, together with a group of related work-support frames, preparatory to the installation of these units in a machine of the type shown in FIGS. 37 and 38.
Figure 45:
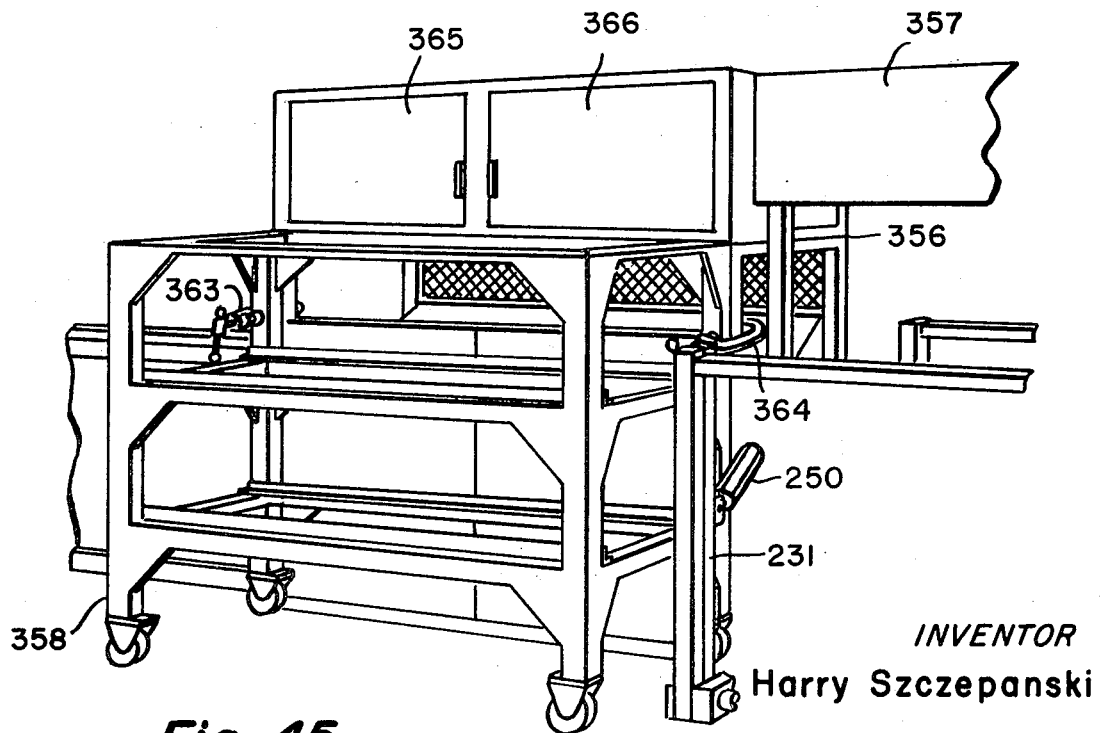
FIG. 45 (Sheet 16) shows the spray-mechanism module transferred from the carrier over to the machine, and the work-support frame support assemblies removed from the carrier after having been installed in the machine.
Figures 49, 50:
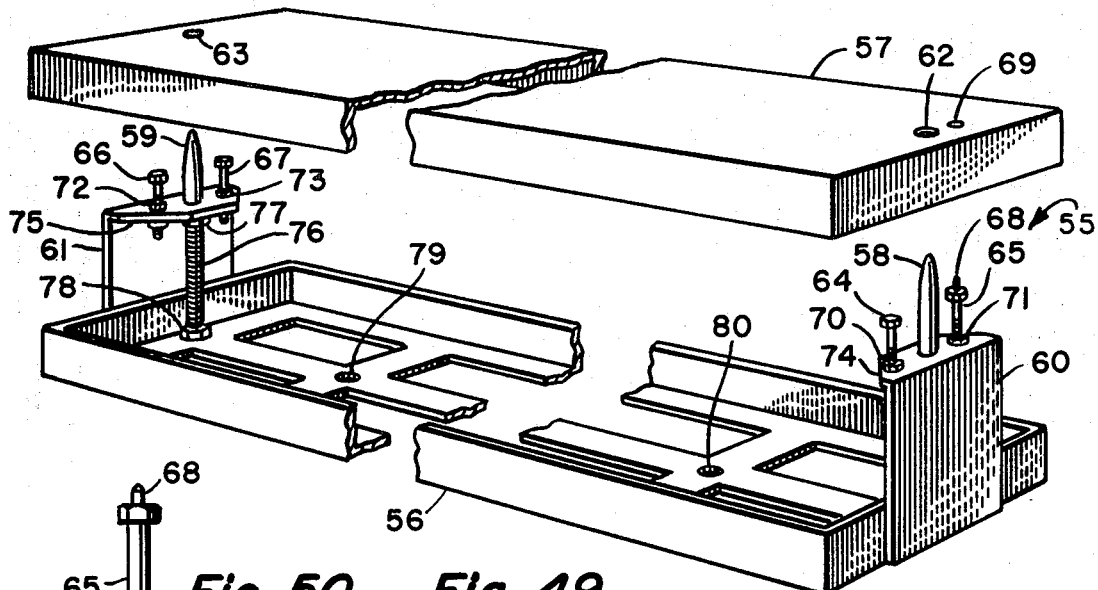
FIG. 49 (Sheet 18) is an exploded view showing the work-support frame and an associated mask.
FIG. 50 (Sheet 18) is a view on an enlarged scale of a special bolt used in the FIG. 49 assembly for preventing an improper placement of the mask.
Figure 51:
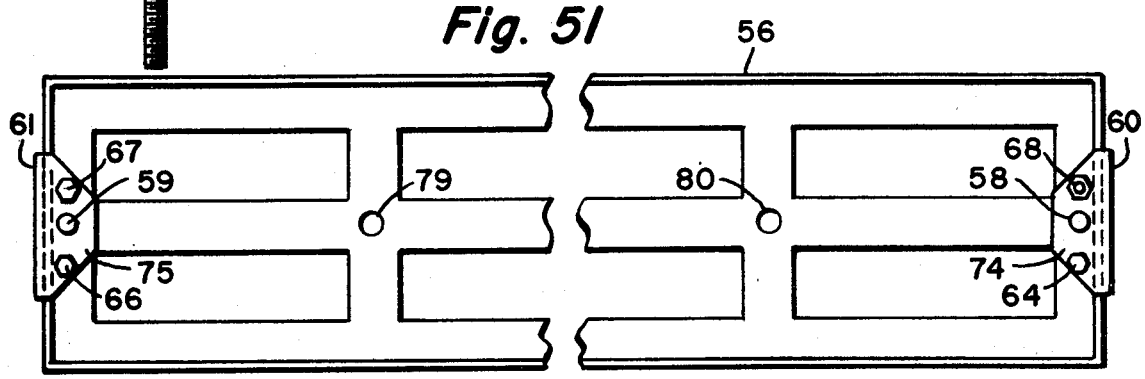
FIG. 51 (Sheet 18) is a plan view of the work-support frame.
Figure 52:
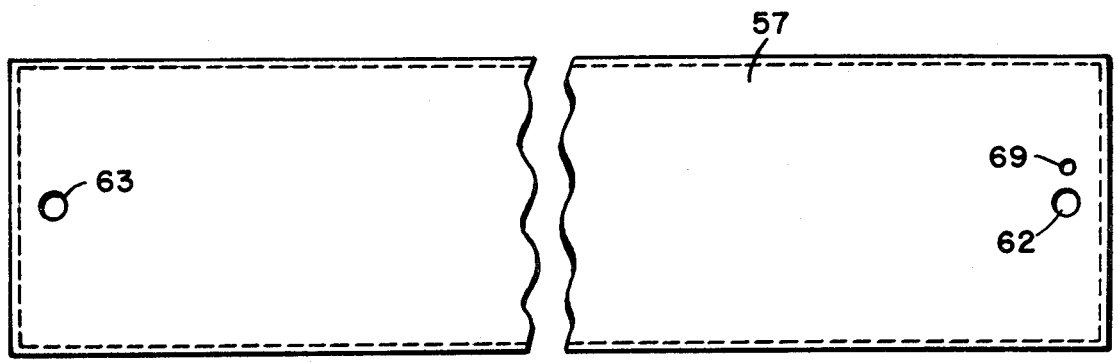
FIG. 52 (Sheet 18) is a plan view of a blank mask.
Figure 53:
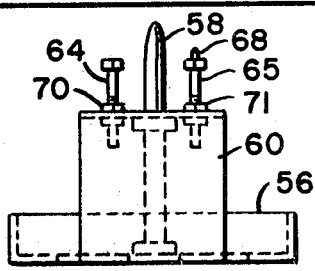
FIG. 53 (Sheet 18) is an end view of the work-support frame shown in FIG. 51.
Figure 56:
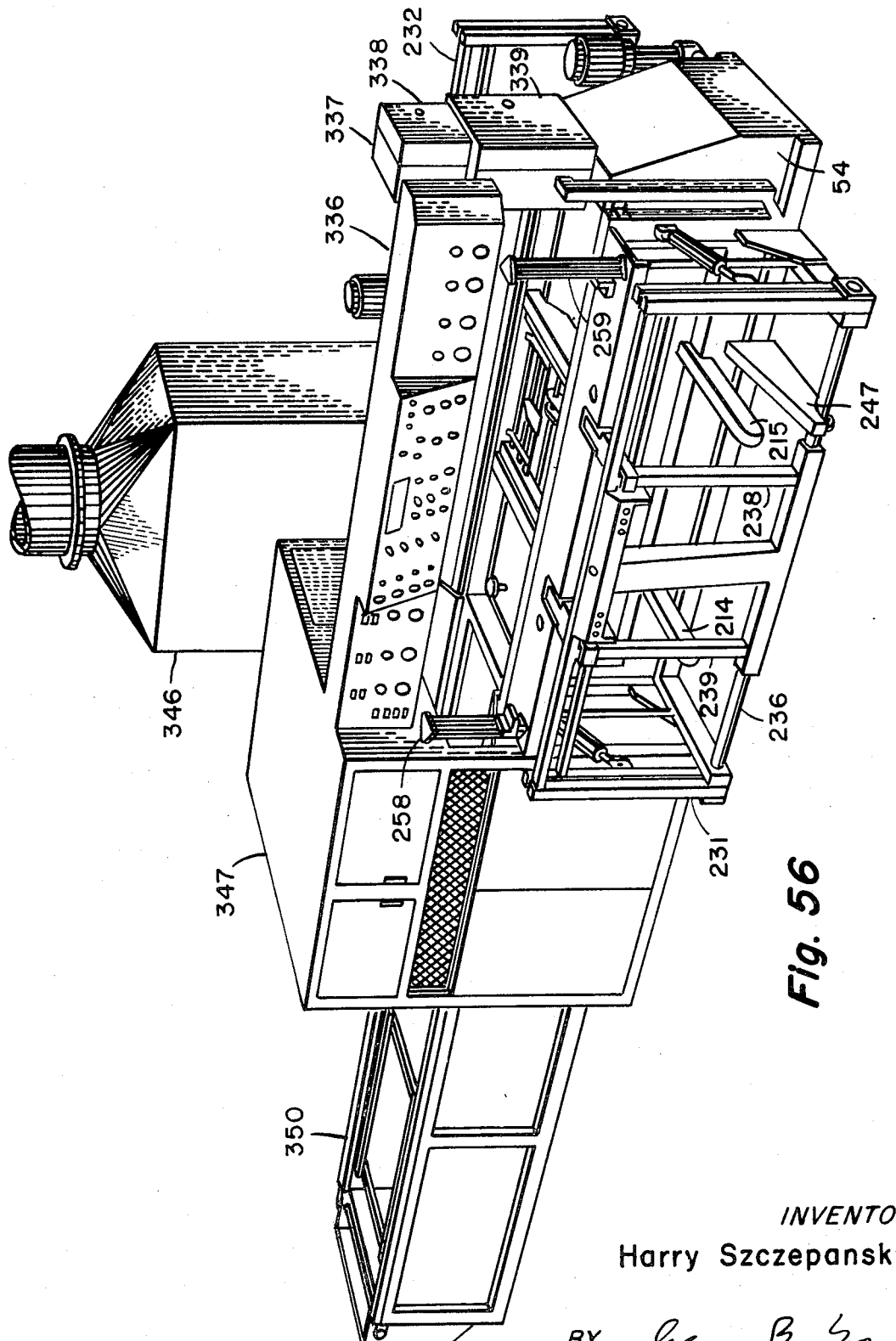
FIG. 56 (Sheet 20) is a perspective view of a modified form of the machine.
Figure 57:
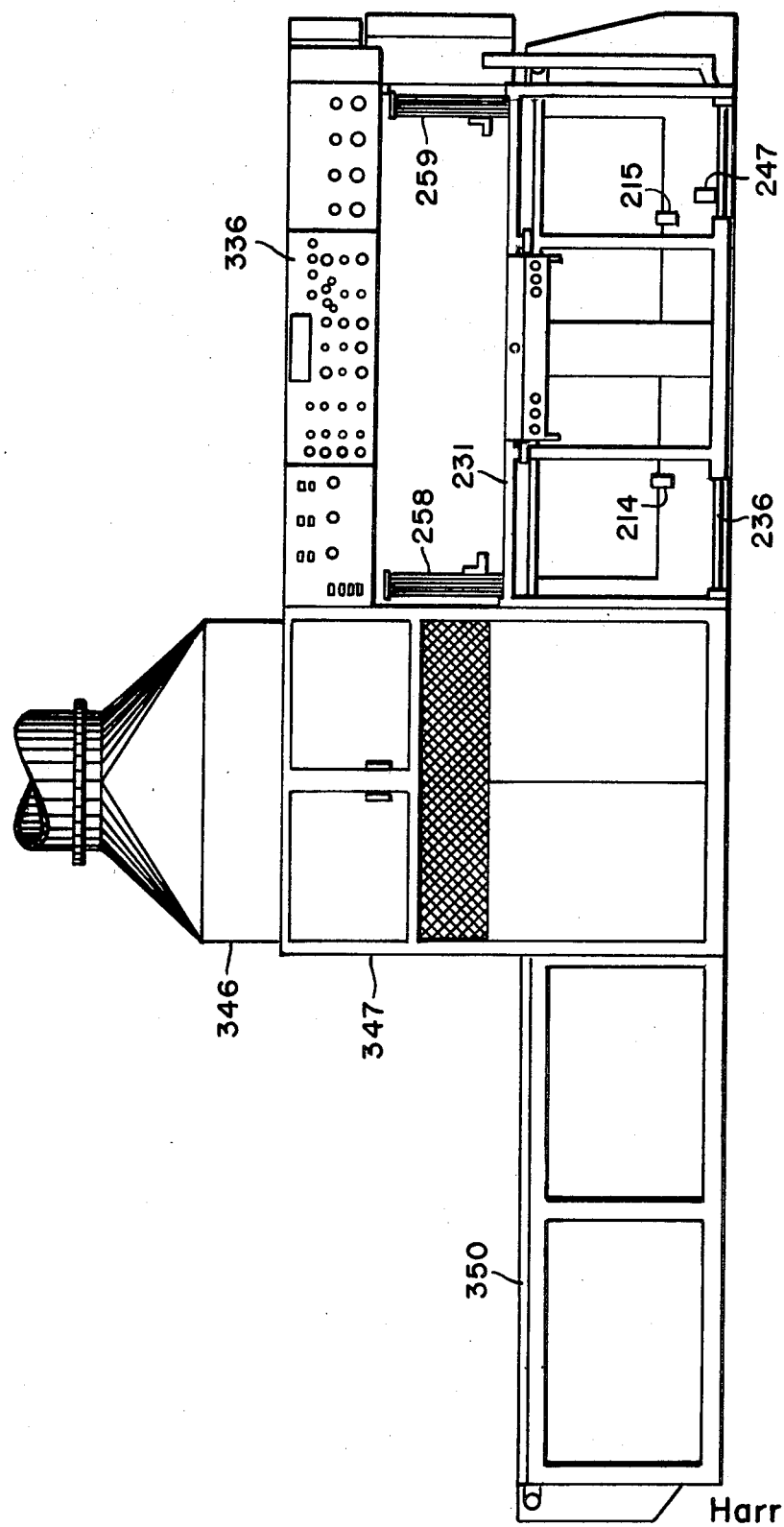
FIG. 57 (Sheet 21) is a front elevation of the machine shown in FIG. 56.
Figure 58:
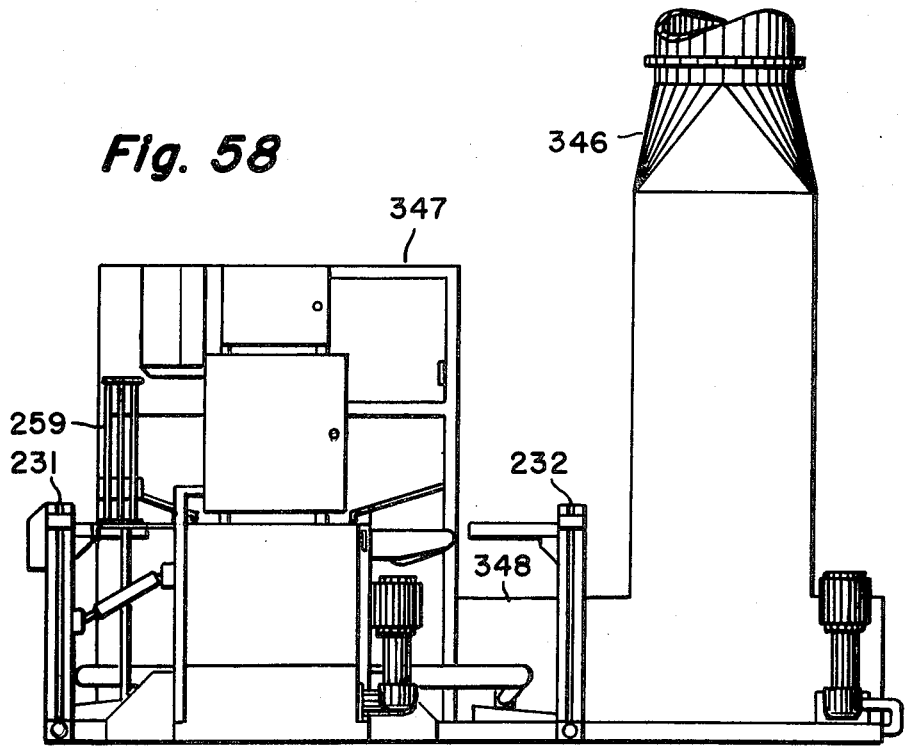
FIG. 58 (Sheet 22) is a view in elevation of the right end of the machine shown in FIG. 56.
Figure 59:
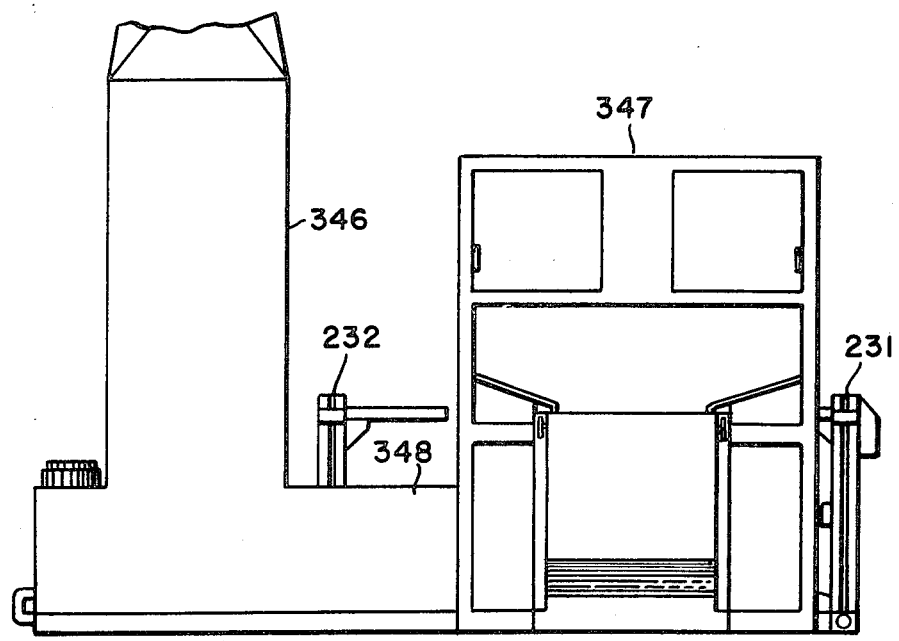
FIG. 59 (Sheet 22) is a view in elevation of the left end of the machine, as shown in FIG. 56.

FIGS. 38–41 (Sheet 14) and 44–45 (Sheet 16) show a spray gun module system that can be detached bodily from the housing as one complete unit. This arrangement may be incorporated in either of the modifications of the machine previously described. The upper housing section 351a is detachable from the lower housing section 351, preferably through the arrangement shown in FIGS. 39–41. At the four corners of the intersection plane between these housing sections, the lower unit is provided with recesses as shown at 352. Projections 353 on the upper housing section register with these recesses, and the bolts 354 traverse the frames of the upper and lower housing sections to hold the two sections firmly in engagement as shown in FIG. 41. The bolts 354 and the nuts 355 are conventional. A complex and complete spray gun installation 15a can be installed or removed from the machine in a matter of minutes, and can be kept in storage until a further call has been made for a resumption of production on the particular job for which that spray gun assembly has been arranged. In view of the separability of the upper housing section 350 from the remainder of the housing structure, it is preferable to incorporate a pillar 356 in the machine to support the end of the instrument console 357 as shown in FIGS. 44 and 45. A special cart 358 is desirable to transport and store the spray gun modules provided by the upper housing section 351a, as well as the work-support assemblies indicated at 359–362 associated with that particular job. FIG. 45 illustrates the manner of transfer of the spray gun module from the cart over to the machine. The upper deck of the cart 358 is approximately coplanar with the line of separation between the upper and lower housing sections 351a and 351. The cart is preferably clamped directly to the framework of the machine by the disengageable C-clamps 363 and 364, so that the upper housing section 351a can be pushed or winched over into place. The work-support assemblies can normally be manually lifted out and placed in position on the machine. The access doors 365 and 366, and the side door 367 are preferably incorporated for purposes of inspection and adjustment of the interior equipment. The top surface of the upper housing section 351a may conveniently be provided with openings for the inflow of ventilating air, so that the upper housing forms part of the entire duct system of the machine, along with the main housing.

What is claimed is:

1. A spray-painting machine including a housing structure forming a work station, work-supporting means having at least a portion thereof disposed within said housing structure, spray means disposed above said work station and within said housing structure, ventilation means including duct means associated with said housing structure for inducing air flow downwardly from said work station, and water-wash means including at least one liquid-receiving and laterally-extending panel disposed below said work station, a lower laterally-extending panel disposed below said liquid-receiving panel in a position to receive overflow from an edge thereof, liquid supply means for maintaining a flow of liquid over said panels in sequence to define a first liquid screen therebetween, wherein the improvement comprises; means for atomizing a portion of said liquid supply to establish a second liquid screen laterally of said first liquid screen, said ventilation means inducing a flow of high velocity, laterally directed air between said panels and through said first and second liquid screens, said means for atomizing a portion of said liquid supply comprising an upturned flange at the downstream edge of said lower panel for entrapping liquid against the upstream side thereof in the high velocity air flow path whereby liquid is entrained from the entrapped liquid; and said upturned flange extending upwardly into said air flow path for deflecting said laterally directed airflow and entrained liquid upwardly adjacent to and downstream of said upturned flange.

2. A machine as defined in claim 1, additionally including a deflecting panel disposed above said upturned flange, and at a distance therefrom, selected to receive droplets of moisture carried by said air under the airflow conditions established by said ventilation means whereby said second liquid screen traversed by said airflow comprises a sheet of moisture droplets projected upwardly from said upturned flange and impinging on said deflecting panel.

3. In combination with a spray painting machine including a housing structure, a work station and ventilation means for inducing a flow of air into and through said work station, the improvement comprising; said housing structure including locating means for positioning one of a plurality of modular spray units in predetermined relation thereto; a plurality of modular spray units each including frame means having substantially identical locating means adapted for removable interengagement with the locating means on said housing structure; each of said modular spray units further including spray means mounted on said frame means for defining a predetermined spray pattern array relative to said work station whereby different predetermined spray patterns may be projected toward said work station by substitution of one modular spray unit for another on said housing structure; one of said modular spray units being mounted on said housing structure with the locating means thereof in engagement with the locating means on said housing structure for defining one of said predetermined spray patterns; and each said modular spray unit including enclosure means for forming an air duct extension of said housing structure when the same is mounted on said housing structure.

References Cited

UNITED STATES PATENTS

| 2,086,514 | 7/1937 | Saunders | 118—326 X |
| 3,009,439 | 11/1961 | Wald, Jr. et al. | 118—326 X |
| 1,627,096 | 5/1927 | Jones et al. | 118—326 X |
| 2,338,650 | 1/1944 | Lowenthal | 118—326 X |
| 3,386,415 | 6/1968 | Faber | 118—326 X |
| 3,475,202 | 10/1969 | Bok | 118—326 X |

FOREIGN PATENTS

| 1,475,032 | 2/1967 | France | 118—326 |

MERVIN STEIN, Primary Examiner

U.S. Cl. X.R.

118—7, 315, 324

UNITED STATES PATENT OFFICE
CERTIFICATE OF CORRECTION

Patent No. 3,716,022  Dated February 13, 1973

Inventor(s) Harry Szczepanski

It is certified that error appears in the above-identified patent and that said Letters Patent are hereby corrected as shown below:

Column 2, line 34 — "jobs" should be — job — .

Column 2, line 48 — change the comma to a period.

Column 12, line 31 — "295" should be — 293 — .

Column 12, line 32 — "203" should be — 293 — .

Column 13, line 31 — "30" should be — 330 — .

Signed and sealed this 5th day of November 1974.

(SEAL)
Attest:

McCOY M. GIBSON JR.
Attesting Officer

C. MARSHALL DANN
Commissioner of Patents